US010893217B2

(12) United States Patent
Kitaya et al.

(10) Patent No.: US 10,893,217 B2
(45) Date of Patent: Jan. 12, 2021

(54) ELECTRONIC APPARATUS AND METHOD FOR CLIPPING A RANGE OUT OF A WIDE FIELD VIEW IMAGE

(71) Applicant: CANON KABUSHIKI KAISHA, Tokyo (JP)

(72) Inventors: Koki Kitaya, Kawasaki (JP); Shin Murakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 16/231,152

(22) Filed: Dec. 21, 2018

(65) Prior Publication Data

US 2019/0208142 A1 Jul. 4, 2019

(30) Foreign Application Priority Data

Dec. 28, 2017 (JP) .................................. 2017-254236

(51) Int. Cl.
*H04N 5/262* (2006.01)
*H04N 5/232* (2006.01)

(52) U.S. Cl.
CPC ....... *H04N 5/2628* (2013.01); *H04N 5/23238* (2013.01); *H04N 5/23245* (2013.01)

(58) Field of Classification Search
None
See application file for complete search history.

(56) References Cited

U.S. PATENT DOCUMENTS

| 8,941,721 | B2* | 1/2015 | Kim | H04N 1/00307 348/46 |
| 10,609,279 | B2* | 3/2020 | Izumihara | H04N 1/00392 |
| 2003/0214603 | A1* | 11/2003 | Manning | H04N 7/0157 348/445 |
| 2005/0146631 | A1* | 7/2005 | Shelton | H04N 5/2628 348/333.12 |
| 2006/0204079 | A1* | 9/2006 | Yamaguchi | G06K 9/6211 382/154 |
| 2007/0188629 | A1* | 8/2007 | Nakabe | H04N 5/23245 348/231.3 |

(Continued)

FOREIGN PATENT DOCUMENTS

| CN | 103448634 A | 12/2013 |
| CN | 103888646 A | 6/2014 |

(Continued)

*Primary Examiner* — Jayanti K Patel
*Assistant Examiner* — Stefan Gadomski
(74) *Attorney, Agent, or Firm* — Canon U.S.A., Inc. IP Division

(57) ABSTRACT

An electronic apparatus includes a control unit configured to, if an operation mode in capturing a wide field view image is a first operation mode, perform control to clip out a first range in which a predetermined range with respect to a center of a clipped image includes any one of above an imaging apparatus, above in a direction of gravity, and below in the direction of gravity, and if the operation mode is a second operation mode, perform control to clip a second range in which, different from the first range, a predetermined range with respect to a center of a clipped image includes a direction perpendicular to a vertical direction of the imaging apparatus or a direction perpendicular to gravity, or to not perform clipping.

14 Claims, 10 Drawing Sheets

(56) References Cited

U.S. PATENT DOCUMENTS

| | | | | |
|---|---|---|---|---|
| 2008/0298796 | A1* | 12/2008 | Kuberka | G03B 17/18 396/263 |
| 2010/0271485 | A1* | 10/2010 | Kim | G06K 9/32 348/169 |
| 2010/0315525 | A1* | 12/2010 | Ikeda | G03B 17/18 348/222.1 |
| 2011/0050963 | A1* | 3/2011 | Watabe | H04N 5/2259 348/240.2 |
| 2012/0120188 | A1* | 5/2012 | Arai | H04N 5/2258 348/36 |
| 2012/0154591 | A1* | 6/2012 | Baur | B60R 1/00 348/148 |
| 2013/0162759 | A1* | 6/2013 | Alakarhu | H04N 5/2625 348/36 |
| 2013/0194447 | A1* | 8/2013 | Sudo | H04N 5/23293 348/222.1 |
| 2013/0222646 | A1* | 8/2013 | Tsubota | H04N 5/217 348/239 |
| 2013/0342714 | A1* | 12/2013 | Zhou | H04N 5/23258 348/208.2 |
| 2014/0285617 | A1* | 9/2014 | Arai | H04N 5/23238 348/36 |
| 2015/0054965 | A1* | 2/2015 | Sudo | H04N 5/23293 348/169 |
| 2015/0156421 | A1* | 6/2015 | Sokeila | H04N 5/2628 348/240.2 |
| 2015/0178595 | A1* | 6/2015 | Sawada | G06T 7/571 382/195 |
| 2015/0249785 | A1* | 9/2015 | Mehta | G06F 3/0488 348/36 |
| 2015/0278581 | A1* | 10/2015 | Fukushima | G06K 9/00241 382/118 |
| 2016/0044276 | A1* | 2/2016 | Shearman | A42B 3/0426 348/207.1 |
| 2016/0182863 | A1 | 6/2016 | Watanabe et al. | |
| 2016/0191819 | A1* | 6/2016 | Sakai | H04N 5/2621 348/333.12 |
| 2016/0219217 | A1* | 7/2016 | Williams | H04N 5/23229 |
| 2016/0269635 | A1* | 9/2016 | Ito | G06T 7/70 |
| 2017/0076477 | A1 | 3/2017 | Nakakusu | |
| 2017/0150053 | A1 | 5/2017 | Eline | |
| 2017/0176746 | A1 | 6/2017 | Weller et al. | |
| 2017/0244943 | A1* | 8/2017 | Saito | G06F 3/04842 |
| 2017/0316600 | A1* | 11/2017 | Jeong | G06T 15/20 |
| 2017/0324899 | A1* | 11/2017 | Ohba | H04N 5/2258 |
| 2018/0077360 | A1* | 3/2018 | Furukawa | H04N 5/265 |
| 2018/0120534 | A1* | 5/2018 | Mohri | G02B 7/38 |
| 2018/0130243 | A1* | 5/2018 | Kim | G06T 11/60 |
| 2018/0152623 | A1* | 5/2018 | Li | H04N 5/23293 |
| 2018/0205934 | A1* | 7/2018 | Abbas | H04N 19/597 |
| 2018/0255236 | A1* | 9/2018 | Izumihara | H04N 5/23219 |
| 2018/0278821 | A1* | 9/2018 | Yu | H04N 5/23258 |
| 2018/0315156 | A1* | 11/2018 | Shin | G06T 5/50 |
| 2018/0332265 | A1* | 11/2018 | Hwang | H04N 13/183 |
| 2019/0026858 | A1* | 1/2019 | Lin | H04N 19/59 |
| 2019/0098180 | A1* | 3/2019 | Tachi | H04N 5/04 |
| 2019/0132265 | A1* | 5/2019 | Nowak-Przygodzki | G06F 3/167 |
| 2019/0158799 | A1* | 5/2019 | Gao | H04N 13/239 |
| 2019/0251672 | A1* | 8/2019 | Lim | G06T 5/002 |
| 2019/0253667 | A1* | 8/2019 | Valli | H04S 7/303 |
| 2019/0340737 | A1 | 11/2019 | Kawaguchi et al. | |

FOREIGN PATENT DOCUMENTS

| | | |
|---|---|---|
| CN | 204206295 U | 3/2015 |
| CN | 105191280 A | 12/2015 |
| CN | 105379244 A | 3/2016 |
| CN | 106161985 A | 11/2016 |
| CN | 106664349 A | 5/2017 |
| CN | 106911902 A | 6/2017 |
| CN | 106998413 A | 8/2017 |
| JP | 2016-019249 A | 2/2016 |
| JP | 2017-147682 A | 8/2017 |
| WO | 2013/133456 A1 | 9/2013 |

* cited by examiner

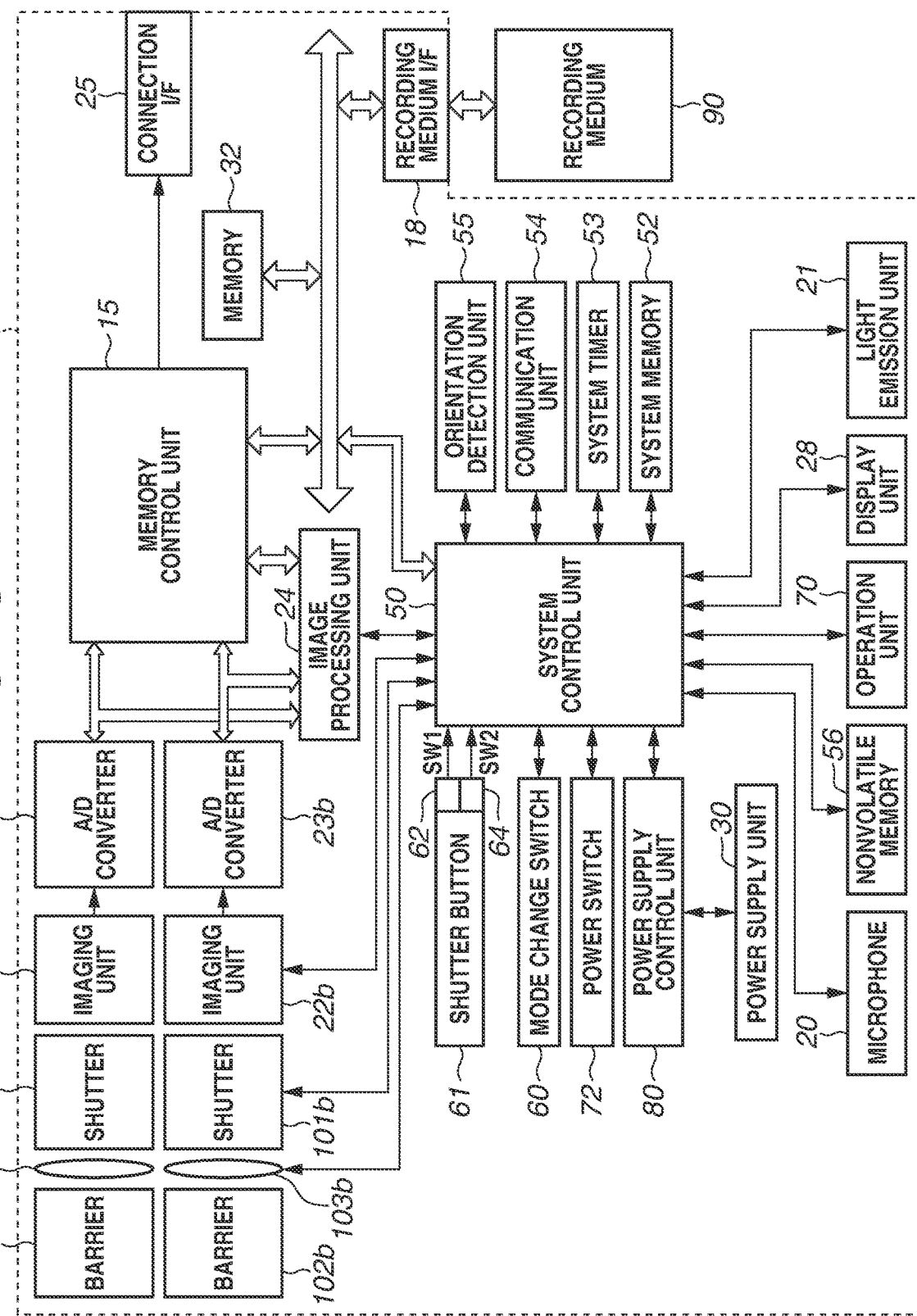

FIG.3A

IMAGING MODE
- ☐ AUTOMATIC
- ☐ MANUAL
- ▷ ☑ STARRY SKY
- ☐ DASHCAM

FIG.3B

INSTALLATION POSITION SETTING
    NOT SPECIFIED
    HANDHELD
▷ TRIPOD
    SELFIE STICK
    HELMET
    CEILING
    BICYCLE/SKI/SNOWBOARD
    CAR

ELECTRONIC APPARATUS AND METHOD FOR CLIPPING A RANGE OUT OF A WIDE FIELD VIEW IMAGE

BACKGROUND OF THE INVENTION

Field of the Invention

The present invention relates to an electronic apparatus and a method for controlling the electronic apparatus, and more particularly to a clipping control method for an image having a wide video range.

Description of the Related Art

There are known imaging apparatuses that can handily capture an entire celestial sphere image (omnidirectional image or all-around image) in 360° directions by one imaging operation. Imaging apparatuses that capture an image of a wide range of 180° or more, if not 360°, are also known. There are known methods for displaying a partial display range of such an image and changing and displaying the display range based on user's operations or the orientation of a display apparatus. In such a display, the display range can be mainly changed in directions of rotation about two axes, including the direction of rotation within a horizontal plane about the zenith and the direction of vertical rotation (direction for changing an angle of elevation or angle of depression).

Since an omnidirectional image is captured over a wide range, an originally unintended object may sometimes be included. For this reason, a technique of clipping a partial range out of an omnidirectional image is known.

Japanese Patent Application Laid-Open No. 2016-19249 discusses a technique of performing clipping to remove a portion where the photographer is included in an omnidirectional image, and performing editing to develop the clipped image about the side toward which the photographer faces (the direction of the line of sight of the photographer).

An omnidirectional image has such a problem that even an originally unwanted object can be included and a problem that the volume of data increases due to inclusion of a video image in all directions. In such a case, clipping out a partial area is sometimes needed.

Japanese Patent Application Laid-Open No. 2016-19249 discusses a technique of performing clipping to remove the portion where the photographer is included. However, the direction of interest to be clipped out is not only determined by the presence or absence of the user. In such a case, the user may perform operations to manually determine the clipping range and perform clipping processing. However, it is troublesome if the user needs to determine the clipping range.

SUMMARY OF THE INVENTION

The present invention is directed to a technique that enables clipping a more suitable range out of a wide field view image without complicated operations.

According to an aspect of the present invention, an electronic apparatus comprising a memory and at least one processor and/or at least one circuit to perform the operations of the following units an image acquisition unit configured to obtain a wide field view image having a wide field of view angle, captured by one or more image sensors, and a control unit configured to, perform control, if an operation mode in capturing the wide field view image by the one or more image sensors is a first operation mode, to clip out a first range in such a manner that a predetermined range with respect to a center of a clipped video image includes any one of above an imaging apparatus, above in a direction of gravity, and below in the direction of gravity, the first range being a part of the wide field view image, and perform control, if the operation mode is a second operation mode, to clip out a second range in such a manner that, different from the first range, a predetermined range with respect to a center of a clipped video image includes a direction perpendicular to a vertical direction of the imaging apparatus or a direction perpendicular to gravity, the second range being a part of the wide field view image, or not to perform clipping.

Further features of the present invention will become apparent from the following description of exemplary embodiments with reference to the attached drawings.

BRIEF DESCRIPTION OF THE DRAWINGS

FIG. 1C is a block diagram illustrating a configuration of the digital camera.

FIG. 3A is a display example of an imaging mode setting screen and FIG. 3B is a display example of an installation position setting screen.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1A:
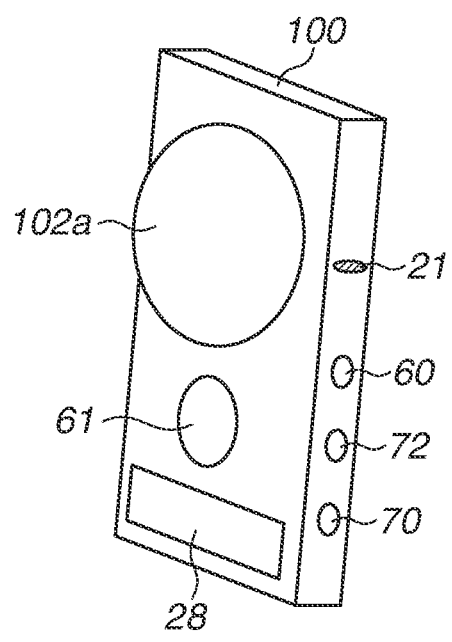
FIG. 1A is a front external view of a digital camera.
Figure 1B:
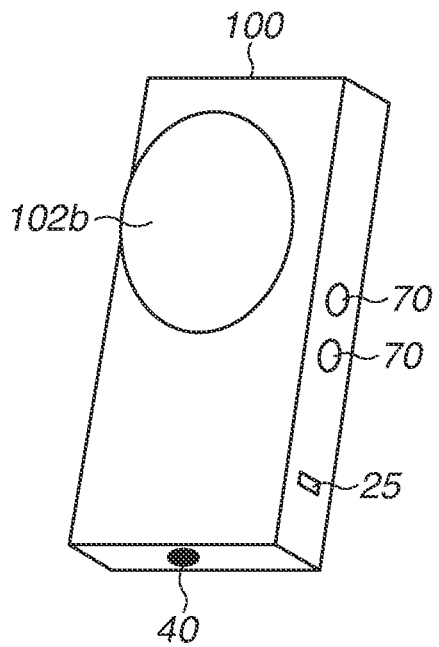
FIG. 1B is a rear external view of the digital camera.

FIG. 1A illustrates a front perspective view (external view) of a digital camera 100 (imaging apparatus), which is an electronic apparatus. FIG. 1B illustrates a rear perspective view (external view) of the digital camera 100. The digital camera 100 is an omnidirectional camera (entire celestial sphere camera).

A barrier 102a is a protection window of an imaging lens 103a intended for a camera unit (i.e., barrier 102a, shutter 101a, imaging unit 22a, and A/D converter 23a), which has an imaging range in front of the digital camera 100. An outside surface of the imaging lens 103a itself may serve as the barrier 102a. The camera unit is a wide-angle camera having an imaging range as wide as vertically and horizontally 180° or more in front of the digital camera 100. A barrier 102b is a protection window of an imaging lens 103b intended for a camera unit b (i.e., barrier 102b, shutter 101b, imaging unit 22b, and A/D converter 23b), which has an imaging range behind the digital camera 100. An outside surface of the imaging lens 103b itself may serve as the barrier 102b. The camera unit b is a wide-angle camera having an imaging range as wide as vertically and horizontally 180° or more behind the digital camera 100.

A display unit 28 is a display unit for displaying various types of information. A shutter button 61 is an operation unit for giving an imaging instruction. A mode change switch 60 is an operation unit for switching various modes. A connection interface (I/F) 25 is a connector between the digital camera 100 and a connection cable for connecting to an external device, such as a smartphone, a personal computer, and a television set. An operation unit 70 is an operation unit including operation members such as various switches, buttons, dials, and touch sensors for accepting various operations from a user. A power switch 72 is a push button for switching power on and off.

A light emission unit 21 is a light emission member such as a light-emitting diode (LED). The light emission unit 21 notifies the user of various states of the digital camera 100 by using light emission patterns and light emission colors. A fixing portion 40 is a tripod screw hole. The fixing portion 40 is, for example, a member for fixing and installing the digital camera 100 onto a fixing device such as a tripod. The fixing portion 40 is arranged in the bottom surface of the digital camera 100.

FIG. 1C is a block diagram illustrating a configuration example of the digital camera 100. The barrier 102a covers an imaging system of the camera unit a of the digital camera 100 including the imaging lens 103a, and thereby prevents stains and damage to the imaging system including the imaging lens 103a, a shutter 101a, and an imaging unit 22a. The imaging lens 103a is a lens unit including a zoom lens and a focus lens. The imaging lens 103a is a wide-angle lens. The shutter 101a is a shutter having an aperture function of adjusting the amount of object light incident on the imaging unit 22a. The imaging unit 22a is an image sensor (imaging sensor) such as a charge-coupled device (CCD) sensor or complementary metal-oxide-semiconductor (CMOS) sensor for converting an optical image into an electrical signal. An analog-to-digital (A/D) converter 23a converts an analog signal output from the imaging unit 22a into a digital signal. The imaging lens 103a, the shutter 101a, and the imaging unit 22a are controlled by a system control unit 50.

The barrier 102b covers an imaging system of the camera unit b of the digital camera 100 including the imaging lens 103b, and thereby prevents stains and damage to the imaging system including the imaging lens 103b, a shutter 101b, and an imaging unit 22b. The imaging lens 103b is a lens unit including a zoom lens and a focus lens. The imaging lens 103b is a wide-angle lens. The shutter 101b is a shutter having an aperture function of adjusting the amount of object light incident on the imaging unit 22b. The imaging unit 22b is an image sensor such as a CCD sensor or CMOS sensor for converting an optical image into an electrical signal. An A/D converter 23b converts an analog signal output from the imaging unit 22b into a digital signal. The imaging lens 103b, the shutter 101b, and the imaging unit 22b are controlled by the system control unit 50.

The imaging units 22a and 22b capture a virtual reality (VR) image. A VR image refers to an image that can be VR-displayed (displayed in a VR view). VR images include an omnidirectional image (entire celestial sphere image) captured by an omnidirectional camera (entire celestial sphere camera), and a panoramic image having a video range (effective video range) wider than a display range that can be displayed on a display unit at a time. VR images include not only still images but also moving images and live images (images obtained from a camera almost in real time). A VR image has a video range (effective video range) of a field of view of up to 360° in a vertical direction (vertical angle, angle from the zenith, angle of elevation, angle of depression, elevation angle, or pitch angle) and 360° in a horizontal direction (horizontal angle, azimuth angle, yaw angle, or yaw direction). VR images also include an image having an angle of view (field of view range) wider than the angle of view that can be captured by a normal camera, or an image having a video range (effective video range) wider than a display range that can be displayed on a display unit at a time, even if vertically smaller than 360° and/or horizontally smaller than 360°. For example, an image captured by an entire celestial sphere camera that can capture an image of an object in a field of view (angle of view) of 360° in the horizontal direction (horizontal angle or azimuth angle) and 210° in the vertical angle about the zenith is a kind of VR image. For example, an image captured by a camera that can capture an image of an object in a field of view (angle of view) of 180° in the horizontal direction (horizontal angle or azimuth angle) and 180° in the vertical angle about the horizontal direction is a kind of VR image. Thus, an image that has a video range of a field of view of 160° (±80°) or more in both the vertical and horizontal directions and has a video range wider than a range that a human can visually observe at a time is a kind of VR image. If such a VR image is VR-displayed, the user can view an omnidirectional image that is seamless in the horizontal direction (horizontal rotation direction) by changing the orientation of the display device in the horizontal rotation direction. In the vertical direction (vertical rotation direction), the user can view an omnidirectional image that is seamless within the range of ±105° as seen from directly above (the zenith). The range beyond 105° from directly above is a blank area where there is no video image. A VR image can be said to be an "image having a video range that is at least part of a virtual space (VR space)".

VR display refers to a display method that can change the display range of a VR image where a video image within the field of view range according to the orientation of the display device is displayed. If the user wears and views a head-mounted display (HMD) serving as the display device, a video image within the field of view range according to the direction of the user's face is displayed. For example, assume that a video image having a field of view angle (angle of view) about 0° in the horizontal direction (a specific direction such as to the north) and 90° in the vertical direction (90° from the zenith, i.e., horizontal) in a VR image is displayed at a specific point at a certain time. If the orientation of the display unit is reversed from such a state (e.g., the display surface is changed from southward to northward), the display range of the same VR image is changed to a video image having a field of view angle setting 180° as a center in the horizontal direction (the opposite direction such as to the south) and setting 90° as a center in the vertical direction (horizontal). In a case of viewing the HMD, if the user turns the face from the north to the south (i.e., turns back), the video image displayed on the HMD also changes from a video image of the north to a video image of the south. Such VR display can visually provide the user a sense (sense of immersion) as if the user is present inside the VR image (in the VR space). A smartphone mounted on a VR goggles (head mount adapter) can be said to be a kind of HMD. The method for displaying a VR image is not limited to the foregoing VR display. The field of view range can be changed and displayed by moving (scrolling) the display range according to user operations on a touch panel or directional buttons, instead of changing orientation.

An image processing unit 24 performs predetermined resizing processing, such as pixel interpolation and reduction, and color conversion processing on data from the A/D converters 23a and 23b or data from a memory control unit 15. The image processing unit 24 also performs predetermined calculation processing by using captured image data. The system control unit 50 performs exposure control and distance measurement control based on the calculation results obtained by the image processing unit 24. Automatic focus (AF) processing, automatic exposure (AE) processing, and flash preliminary emission (electronic flash (EF)) processing are thereby performed. The image processing unit 24 further performs predetermined calculation processing by using the captured image data, and performs automatic white balance (AWB) processing based on the obtained calculation results. The image processing unit 24 applies basic image processing to two images (fish-eye images or wide-angle images) obtained from the A/D converters 23a and 23b, and then combines (performs connection image processing on) the two images to generate a single VR image. In the connection image processing of the two images, the image processing unit 24 calculates, with respect to each of the two images, amounts of deviation between a reference image and a comparative image by pattern matching processing for each area, and detects connection positions. The image processing unit 24 then corrects distortion of each of the two images by geometric transformation and converts each image into an entire celestial sphere image format, in consideration of the detected connection positions and the lens characteristics of the respective optical systems. The image processing unit 24 blends the two images of the entire celestial sphere image format to eventually generate a single entire celestial sphere image (VR image). The generated entire celestial sphere image (VR image) is an image of equidistant cylindrical projection, and the position of each pixel can be associated with coordinates on a spherical surface. During live viewing of VR display or during playback, the image processing unit 24 performs image clipping processing, enlargement processing, and distortion correction for a VR display of the VR image, and performs rendering to draw the VR image in a video random access memory (VRAM) of a memory 32.

Output data from the A/D converters 23a and 23b is written to the memory 32 via the image processing unit 24 and the memory control unit 15, or via the memory control unit 15 without the intervention of the image processing unit 24. The memory 32 stores image data that is obtained by the imaging units 22a and 22b and converted into digital data by the A/D converters 23a and 23b, and images to be output to an external display from the connection I/F 25. The memory 32 has a storage capacity sufficient to store a predetermined number of still images and a predetermined duration of moving images and audios.

The memory 32 also serves as an image display memory (video memory). Image display data stored in the memory 32 can be output to an external display from the connection I/F 25. An electronic viewfinder can be implemented to provide a live view display (LV display) by successively transferring and displaying VR images that are captured by the imaging units 22a and 22b, generated by the image processing unit 24, and stored in the memory 32 onto an external display. Hereinafter, an image displayed in a live view will be referred to as an LV image. A live view display (remote LV display) can also be performed by transferring VR images stored in the memory 32 to an external device (e.g., a smartphone) wirelessly connected via a communication unit 54 and displaying the VR images on the external device. The main body of the digital camera 100 may be configured to include a main body display capable of displaying an image, and a video image equivalent to that described to be output from the connection I/F 25 and displayed on an external display may be displayed on the main body display.

A nonvolatile memory 56 is a memory serving as an electrically erasable and recordable recording medium. For example, an electrically erasable programmable read-only memory (EEPROM) is used as the nonvolatile memory 56. The nonvolatile memory 56 stores operating constants and programs for the system control unit 50. The programs here refer to computer programs for implementing various flowcharts to be described below in the present exemplary embodiment.

The system control unit 50 is a control unit including at least one processor or circuit, and controls the entire digital camera 100. The system control unit 50 implements various types of processing according to the present exemplary embodiment to be described below by executing the programs recorded in the nonvolatile memory 56. A system memory 52 includes, for example, a random access memory (RAM) e. Operating constants and variables for the system control unit 50 and the programs read from the nonvolatile memory 56 are loaded into the system memory 52. The system control unit 50 also performs display control by controlling the memory 32, the image processing unit 24, and the memory control unit 15.

A system timer 53 is a timer unit for measuring time used for various controls and the time of a built-in clock.

The mode change switch 60, the shutter button 61, and the operation unit 70 are operation units for inputting various operation instructions to the system control unit 50. The mode change switch 60 switches an operation mode of the system control unit 50 to any one of a still image recording mode, a moving image capturing mode, a playback mode, and a communication connection mode. The still image recording mode includes an automatic imaging mode, an automatic scene determination mode, a manual mode, an aperture priority mode (Av mode), a shutter speed priority mode (Tv mode), and a program AE mode. There are also various scene modes and custom modes, which are imaging settings specific to respective imaging scenes. The user can directly switch to any one of the modes by using the mode change switch 60. Alternatively, the user may once switch to a list screen of imaging modes by using the mode change switch 60, and then select and switch to any one of a plurality of modes displayed on the display unit 28 by using other operation members. Similarly, the moving image capturing mode may include a plurality of modes.

A first shutter switch 62 turns on to generate a first shutter switch signal SW1 if the shutter button 61 provided on the digital camera 100 is operated halfway, i.e., half-pressed (imaging preparation instruction). Imaging preparation operations such as the AF processing, the AE processing, the AWB processing, and the EF processing are started in response to the first shutter switch signal SW1.

A second shutter switch 64 turns on to generate a second shutter switch signal SW2 if the operation of the shutter button 61 is completed, i.e., the shutter button 61 is full-pressed (imaging instruction). In response to the second shutter switch signal SW2, the system control unit 50 starts a series of operations for imaging processing from the reading of signals from the imaging units 22*a* and 22*b* to the writing of image data to a recording medium 90.

The shutter button 61 is not limited to the button allowing a full-press and a half-press, i.e., two stages of operations, and may be an operation member only allowing one stage of pressing. In such a case, the imaging preparation operations and the imaging processing are continuously performed according to one stage of pressing. Such operations are similar to those executed when a shutter button allowing a half-press and a full-press is fully pressed at once (operations executed when the first and second shutter switch signals SW1 and SW2 are generated almost at the same time).

The operation members of the operation unit 70 are respectively assigned appropriate functions scenes and function as various function buttons if various function icons and options displayed on the display unit 28 are selected and operated. Examples of the function buttons include an end button, a back button, an image forward button, a jump button, a narrow-down button, and an attribute change button. For example, if a menu button is pressed, a menu screen allowing various settings is displayed on the display unit 28. The user can intuitively make various settings by operating the operation unit 70 while viewing the menu screen displayed on the display unit 28.

A power supply control unit 80 includes a battery detection circuit, a direct-current-to-direct-current (DC-DC) converter, and a switch circuit for switching blocks to be energized. The power supply control unit 80 detects the presence or absence of an attached battery, the type of the attached battery, and the remaining battery level of the attached battery. Based on the detection results and instructions from the system control unit 50, the power supply control unit 80 controls the DC-DC converter to supply required voltages to various parts including the recording medium 90 for required periods. A power supply unit 30 includes a primary battery such as an alkaline battery and a lithium battery, a secondary battery such as a nickel-cadmium (NiCd) battery, a nickel metal halide (NiMH) battery, and a lithium-ion (Li) battery, and/or an alternating current (AC) adapter.

A recording medium I/F 18 is an I/F with the recording medium 90 such as a memory card and a hard disk. The recording medium 90 is a recording medium for recording captured images. Examples of the recording medium 90 include a memory card, a semiconductor memory, an optical disk, and a magnetic disk. The recording medium 90 may be a replaceable recording medium that is attachable to and detachable from the digital camera 100, or a built-in recording medium.

The communication unit 54 is connected wirelessly or by a wired cable, and transmits and receives video signals and audio signals. The communication unit 54 can also be connected to a wireless local area network (LAN) and the Internet. The communication unit 54 can also communicate with an external device via Bluetooth® or Bluetooth® Low Energy. The communication unit 54 can transmit images (including LV images) captured by the imaging units 22*a* and 22*b* and images recorded on the recording medium 90, and receive images and other various types of information from an external device.

An orientation detection unit 55 detects the orientation of the digital camera 100 with respect to the direction of gravity. Whether the images captured by the imaging units 22*a* and 22*b* are captured with the digital camera 100 held landscape or with the digital camera 100 held portrait, can be determined based on the orientation detected by the orientation detection unit 55. Degrees of tilts of the captured image in three axial directions, i.e., yaw, pitch, and roll, can also be determined. The system control unit 50 can add direction information according to the orientation detected by the orientation detection unit 55 to the image file of a VR image captured by the imaging units 22*a* and 22*b*, or rotate (adjust the direction of the image for tilt correction) and record the image. At least one of an acceleration sensor, a gyro sensor, a geomagnetic sensor, an azimuth sensor, and an altitude sensor may be used as the orientation detection unit 55. A motion, such as a pan, a tilt, lifting, and whether remaining stationary or not, of the digital camera 100 can be detected by using an acceleration sensor, a gyro sensor, and/or an azimuth angle sensor serving as the orientation detection unit 55.

A microphone 20 is for collecting sounds around the digital camera 100 to be recorded as the audio of a moving image of a VR image.

The connection I/F 25 is a connection plug for a High-Definition Multimedia Interface (HDMI®) cable or a Universal Serial Bus (USB) cable. The connection I/F 25 is intended to connect to an external device and transmit and receive video images.

Figure 2A:
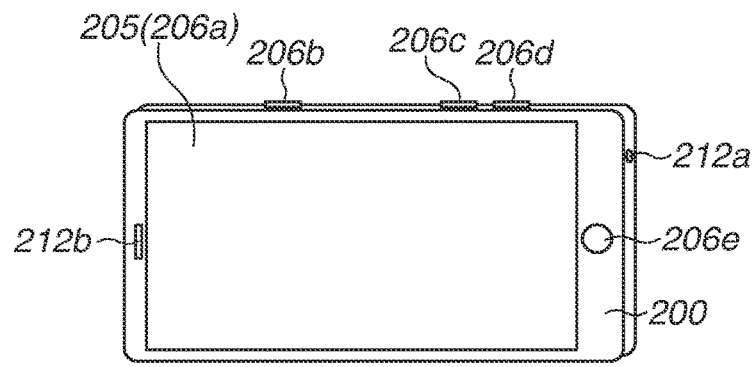
FIG. 2A is an external view of a display control device 200.

FIG. 2A illustrates an example of an external view of a display control device 200, which is a kind of electronic apparatus. An example of the display control device 200 (electronic apparatus) is a smartphone. A display 205 is a display unit for displaying images and various types of information. As will be described below, the display 205 is integrally configured with a touch panel 206*a*, and can detect touch operations on the display surface of the display 205. The display control device 200 can provide a VR display of a VR image (VR contents) on the display 205. As illustrated in the FIG. 2A, an operation unit 206 includes the touch panel 206*a* and operation units 206*b*, 206*c*, 206*d*, and 206*e*. The operation unit 206*b* is a power button that accepts an operation for switching the power of the display control device 200 on and off. The operation units 206*c* and 206*d* are volume buttons for increasing and decreasing the volume of sound output from an audio output unit 212. The operation unit 206*e* is a home button for displaying a home screen on the display 205. An audio output terminal 212*a* is an earphone jack, an output terminal for outputting sound to an earphone or an external speaker. The speaker 212*b* is a main body built-in speaker for issuing sound.

Figure 2B:
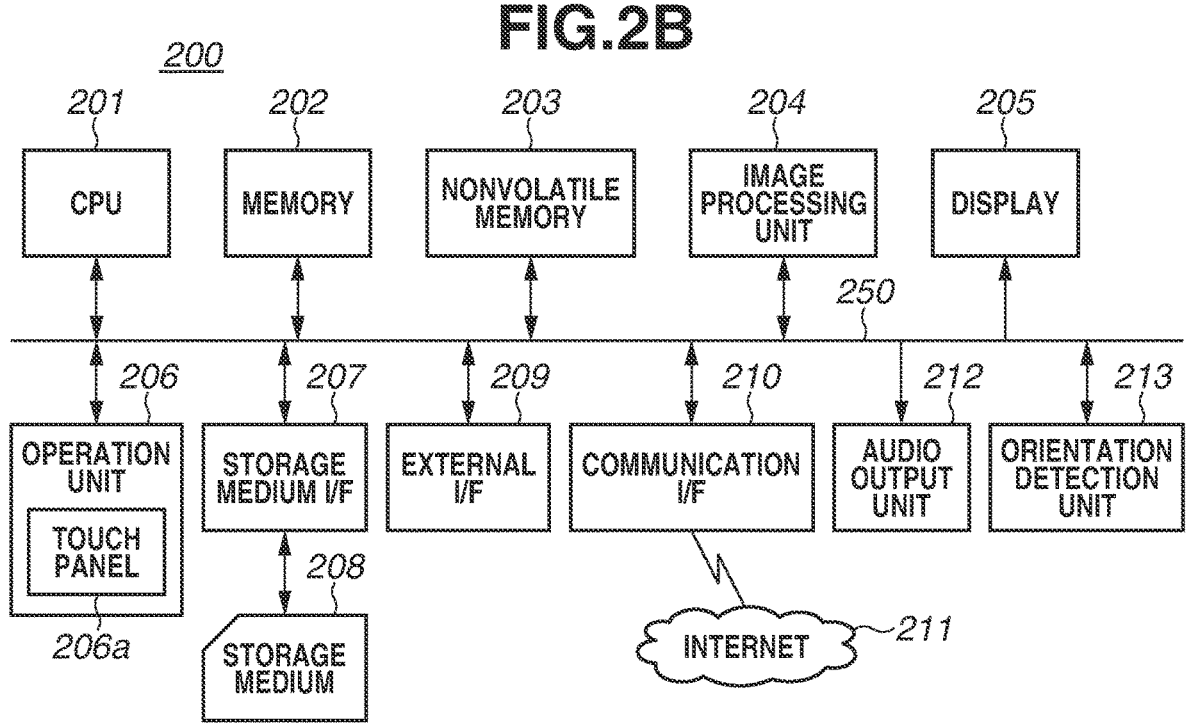
FIG. 2B is a block diagram illustrating a configuration of the display control apparatus.

FIG. 2B illustrates an example of a configuration of the display control device 200. A central processing unit (CPU) 201, a memory 202, a nonvolatile memory 203, an image processing unit 204, the display 205, the operation unit 206, a storage medium I/F 207, an external I/F 209, and a communication I/F 210 are connected to an internal bus 250. The audio output unit 212 and an orientation detection unit 213 are also connected to the internal bus 250. The units connected to the internal bus 250 can exchange data with each other via the internal bus 250.

The CPU 201 is a control unit for controlling the entire display control device 200. The CPU 201 includes at least one processor or circuit. The memory 202 includes, for example, a RAM (volatile memory using a semiconductor element). The CPU 201 controls various units of the display control device 200, for example, according to programs stored in the nonvolatile memory 203 and by using the memory 202 as a work memory. The nonvolatile memory 203 stores image data, audio data, other data, and various programs for the CPU 201 to operate. For example, the nonvolatile memory 203 is a flash memory or a read-only memory (ROM).

The image processing unit 204 applies various types of image processing to images stored in the nonvolatile memory 203 and a storage medium 208, a video signal obtained via the external I/F 209, and images obtained via the communication I/F 210, based on control of the CPU 201. The image processing performed by the image processing unit 204 includes A/D conversion processing, digital-to-analog (D/A) conversion processing, and encoding processing, compression processing, decoding processing, enlargement/reduction processing (resizing), noise reduction processing, and color conversion processing of image data. The image processing unit 204 also performs various types of image processing, such as panoramic development, mapping processing, and conversion, of a VR image, which may be an omnidirectional image or a non-omnidirectional image of wide field view image including a wide range of video image. The image processing unit 204 may include a dedicated circuit block for applying specific image processing. Depending on the type of image processing, the CPU 201 may perform the image processing according to a program, without using the image processing unit 204.

The display 205 displays images and graphical user interface (GUI) screens constituting a GUI, based on control of the CPU 201. The CPU 201 generates a display control signal according to a program, and controls various parts of the display control device 200 to generate and output a video signal to be displayed on the display 205 to the display 205. The display 205 displays a video image based on the output video signal. The display control device 200 itself may include configurations up to an I/F for outputting the video signal to be displayed on the display 205, and the display 205 may be configured as an external monitor (such as a television set).

The operation unit 206 is an input device for accepting user operations. The input device includes a character information input device such as a keyboard, a pointing device such as a mouse and a touch panel, a button, a dial, a joystick, a touch sensor, and/or a touch pad. The touch panel 206a is an input device that is flatly configured to overlap the display 205 and outputs coordinate information according to a touched position.

The storage medium I/F 207 is configured so that the storage medium 208 such as a memory card, a Compact Disc (CD), and a digital versatile disc (DVD) can be mounted thereon. The storage medium I/F 207 reads data from the mounted storage medium 208 and write data to the storage medium 208 based on control of the CPU 201. The external I/F 209 is an I/F for connecting to an external device by a wired cable or wirelessly and inputting and outputting video signals and audio signals. The communication I/F 210 is an interface for communicating with an external device and the Internet 211 and transmitting and receiving various types of data such as a file and a command For example, the communication I/F 210 can communicate with an external device via a wireless LAN, a wired LAN, Bluetooth®, and Bluetooth® Low Energy.

The audio output unit 212 outputs the audio of a moving image or music data (audio file), an operation sound, a ring tone, and various notification sounds. The audio output unit 212 includes the audio output terminal 212a to which an earphone is connected, and the speaker 212b. The audio output unit 212 may output audio data to an external speaker by wireless communication.

The orientation detection unit 213 detects the orientation of the display control device 200 with respect to the direction of gravity, and the tilts of the orientation with respect to the yaw, roll, and pitch axes. Whether the display control device 200 is held landscape, held portrait, directed upward, directed downward, or obliquely oriented can be determined based on the orientation detected by the orientation detection unit 213. At least one of an acceleration sensor, a gyro sensor, a geomagnetic sensor, an azimuth sensor, and an altitude sensor can be used as the orientation detection unit 213. A plurality of sensors may be used in combination.

The operation unit 206 includes the touch panel 206a. The CPU 201 can detect the operations described below or states of the touch panel 206a.

That a finger or pen not in touch with the touch panel 206a newly touches the touch panel 206a, i.e., a start of a touch (hereinafter, referred to as a touch-down).

That a finger or pen is in a state of touching the touch panel 206a (hereinafter, referred to as a touch-on).

That a finger or pen moves while remaining in touch with the touch panel 206a (hereinafter, referred to as a touch-move).

That a finger or pen in touch with the touch panel 206a is released from the touch panel 206a, i.e., an end of a touch (hereinafter, referred to as a touch-up).

That nothing is touching the touch panel 206a (hereinafter, referred to as a touch-off).

If a touch-down is detected, a touch-on is also detected at the same time. After a touch-down, a touch-on usually continues being detected unless a touch-up is detected. If a touch-move is detected, a touch-on is also detected at the same time. If a touch-on is detected and the touched position does not move, a touch-move is not detected. A touch-off is detected if a touch-up is detected for all fingers and pens that have been touching.

The CPU 201 is notified of such operations and states and positon coordinates of the finger(s) or pen touching the touch panel 206a via the internal bus 250. The CPU 201 determines what operation (touch operation) is made on the touch panel 206a based on the notified information. For a touch-move, the CPU 201 can determine the moving direction of the finger or pen moving over the touch panel 206a in terms of a vertical component and a horizontal component on the touch panel 206a separately based on changes in the position coordinates. If a touch-move over a predetermined distance or more is detected, a slide operation is determined to be made. An operation of quickly moving a finger in touch with the touch panel 206a for some distance and immediately releasing the finger is referred to as a flick. In other words, a flick is an operation of quickly stroking the touch panel 206a as if flipping the touch panel 206a with a finger. If a touch-move is detected to be made for a predetermined distance or more at a predetermined speed or higher, and a touch-up is immediately detected, a flick can be determined to be made (a flick can be determined to be made subsequent to a slide operation). An operation of simultaneously touching a plurality of positions (e.g., two points) and making the touched positions approach each other is referred to as a pinch-in. An operation of simultaneously touching a plurality of positions (e.g., two points) and separating the touched positions from each other is referred to as a pinch-out. A pinch-out and a pinch-in are collectively referred to as a pinch operation (or simply as a pinch). Any one of various methods of touch panels, including a resistive, capacitive, surface wave, infrared, electromagnetic induction, image recognition, and optical sensor touch panels, may be used as the touch panel 206a. Some methods detect that a touch is made if the touch panel is contacted. Some methods detect that a touch is made if a finger or pen approaches the touch panel. Any of such methods may be used.

Figure 2C:
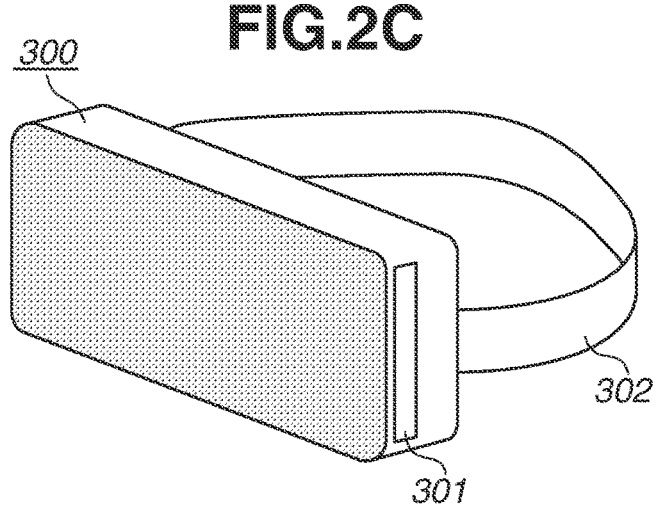
FIG. 2C is an external view of virtual reality (VR) goggles to which the display control device 200 can be mounted.

FIG. 2C illustrates an external view of VR goggles 300 (head mount adapter) to which the display control device 200 can be attached. If attached to the VR goggles 300, the display control device 200 can be used as an HMD. An insertion slot 301 is for inserting the display control device 200 therein. The entire display control device 200 can be inserted into the VR goggles 300 with the display surface of the display 205 directing toward a head band 302 for fixing the VR goggles 300 to the head of the user (i.e., toward the user). If the user wears, on the head, the VR goggles 300 to which the display control device 200 is attached, the user can visually observe the display 205 of the display control device 200 without holding the display control device 200 by hand. If the user moves the user's head or entire body in such a state, the orientation of the display control device 200 also changes. For VR display, the orientation detection unit 213 detects the change in the orientation of the display control device 200, and the CPU 201 performs VR display processing based on the change in orientation. That the orientation detection unit 213 detects the orientation of the display control device 200 is equivalent to that the orientation detection unit 213 detects the orientation of the user's head (direction in which the line of sight of the user is directed). The display control device 200 itself may be an HMD that can be mounted on the head without the VR goggles 300.

The display control device 200 obtains a VR image captured by the digital camera 100 (image acquisition) by a wireless or wired file transfer from the recording medium 90 or by mounting the recording medium 90 such as a memory card into the display control device 200.

The digital camera 100 can capture an image in any one of a plurality of imaging modes. The settable imaging modes include, for example, the following imaging modes:

(1) Automatic mode: an imaging mode in which an image is captured with various imaging settings, such as a shutter speed, an aperture value, an International Organization for Standardization (ISO) sensitivity, and white balance, automatically set based on a scene determination result.

(2) Manual mode: an imaging mode in which an image is captured with various imaging settings, such as a shutter speed, aperture value, ISO sensitivity, and white balance, arbitrarily set by the user.

(3) Starry sky mode: an image mode in which imaging is performed with imaging settings suitable for capturing an image of a starry sky. For example, the shutter speed is set to be slow and the aperture is set to be wide for the dark place. Since noise on the object is highly noticeable, the ISO sensitivity is basically set to be somewhat low but well balanced so that stars are clearly captured. White balance is set so as to be able to capture the night sky and the stars in proper color. The focus position is automatically set to infinity so as to be able to focus the stars at infinity precisely. Alternatively, manual focusing assist processing is performed so as to be able to precisely focus on infinity. Star-enhancing processing (enhancement effect) is performed to slightly increase the areas of bright spots in the captured image. To capture trails of stars in one image, a plurality of images is captured and bright spot portions are clipped out and combined with a base image (comparison synthesized light of the stars). The starry sky mode does not need to include all such processing. The starry sky mode may further include a plurality of imaging modes. Examples of the modes included in the starry sky mode are, though not limited to, the following modes:

(3-1) Starry sky night scene mode: an imaging mode in which a starry sky and a night scene both can be finished each with an appropriate exposure. The captured image is divided into a large number of areas, and starry sky areas and night scene areas are subjected to developing processing appropriate for respective brightness levels. Appropriate white balancing is applied to each area, and color is adjusted. Bright stars are enhanced by the foregoing enhancement effect.

(3-2) Starry sky trail mode: a mode in which images of a starry sky are consecutively captured at predetermined time intervals (interval imaging), and the foregoing "comparison synthesized light of the star" is performed to generate a single still image in which star trails are captured.

(3-3) Starry sky snap mode: a mode for obtaining a single image in which stars and persons are captured each at an appropriate brightness level. Imaging is performed a plurality of times, including first imaging with an exposure appropriate for the stars and second imaging with an exposure appropriate for the foreground such as a person, and an image is generated by combining the images obtained by the first imaging and the image obtained by the second imaging.

(3-4) Starry sky time-lapse mode (starry sky interval mode): a mode for recording a time-lapse moving image that shows the movement of stars as a moving image. Interval imaging is performed at predetermined time intervals, and a moving image is generated by using the obtained plurality of images as respective frame images of the moving image.

(4) Event data recorder (dashboard camera) mode: an imaging mode for using the digital camera 100 as an event data recorder. Imaging settings are made to set an exposure and white balance so as to be able to read vehicle registration plates easily. The event data recorder mode may include a function of starting recording a moving image in response to detection of impact by the orientation detection unit 55, a function of constantly recording a moving image in the memory 32 and saving a moving image before and after detection of impact to the recording medium 90, and/or a function of starting recording in response to detection of a moving body.

(5) Conference mode: a mode for capturing an image of a conference. The audio to be recorded in the moving image is automatically adjusted to make human voices easily understandable. For example, processing for adjusting an audio input level so that human voices are recorded in an easily understandable manner and adjusting frequency characteristics so that human voices are easily understandable (equalizer adjustment) is automatically performed. A function of recording a moving image during periods only when people are considered to be in conversation and of not recording silent sections may be included.

(6) Party mode: a mode for capturing an image of a party or banquet. Exposure is automatically adjusted to be appropriate for an indoor party. An exposure setting is made and white balance is adjusted to make human skin look good. The shutter speed is adjusted to capture an image of moving people without blur. The party mode may include functions of automatically capturing a still image, starting recording a moving image, and/or saving a moving image before and after, in response to detection of a toast, a great cheer, or handclaps.

The user sets the imaging mode of the digital camera 100 by operating the operation unit 70 while viewing a setting screen displayed on the display unit 28. Alternatively, the user can set the imaging mode by operating an external device (such as the display control device 200) wirelessly connected to the digital camera 100 while viewing a setting screen displayed on the external device. FIG. 3A illustrates a display example of an imaging mode setting screen displayed on the display 205 of the display control device 200 connected to the digital camera 100 during an imaging standby state. The automatic, manual, starry sky, and event data recorder modes are displayed as settable options of the imaging mode. Other options of the imaging mode can be further displayed by performing scrolling down. The user can select any one of such options to set the imaging mode. Such imaging mode candidates are just examples. Fewer or more candidates may be provided.

The user can set the digital camera 100 in advance as to which position the display camera 100 is installed for imaging. The user can give instructions to set the installation position by operating the operation unit 70 while viewing a setting screen displayed on the display unit 28 or by operating an external device (such as the display control device 200) wirelessly connected to the digital camera 100 while viewing a setting screen displayed on the external device. FIG. 3B illustrates a display example of an installation position setting screen displayed on the display 205 of the display control device 200 connected to the digital camera 100 during an imaging standby state. As settable options of the installation position, not specified, a handheld position, a tripod, a selfie stick, a helmet, a ceiling, a bicycle/ski/snowboard, and a car are displayed. Options such as a mini tripod and a drone are further displayed by performing scrolling down. The user can select and set any one of the options as the installation position. Such installation position candidates are just examples. Fewer or more candidates may be provided.

Figure 4A:
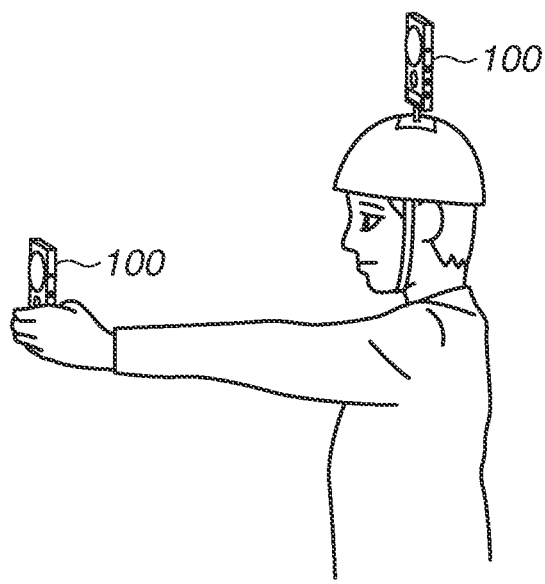
FIGS. 4A to 4C are schematic diagrams illustrating how the digital camera captures an image.

FIG. 4A illustrates a case of capturing an image with the digital camera 100 held by hand, and a case of capturing an image with the digital camera 100 mounted on a helmet. If an image is captured with the digital camera 100 held by hand, the digital camera 100 is often held in front of the user as illustrated in FIG. 4A. In such a case, the user is likely to capture the image of an object as a main object located in the horizontal direction, which is the direction of the line of sight seen from the user side (in front of the user and digital camera). In the present embodiment, if the installation position is set to a handheld position, clipping processing is performed to clip an image range from the full captured image and a particular spot, place or position in the clipped image that corresponds to a horizontal direction, or horizontal axis, with respect to the digital camera 100 is positioned to the center or near the center of the clipped image. The horizontal axis corresponds to a position within the captured image at which the digital camera 100 is positioned to capture the full image, or unclipped image. As a result, a particular spot, place or position in the captured image that corresponds to the horizontal axis is included in a predetermined range from the center of the clipped video image. If an image is captured with the digital camera 100 mounted on a helmet, the digital camera 100 is often attached to the helmet upright as illustrated in FIG. 4A. Again, as in the case of the handheld position, the user is likely to capture the image of an object as a main object located in the horizontal direction which is the direction of the line of sight seen from the user (in front of the camera and user). In the present embodiment, if the installation position is set to a helmet, clipping processing is performed to clip an image range from the captured image and a horizontal direction, or horizontal axis, with respect to the digital camera 100 is positioned to the center or near the center of the clipped image. That a specific spot, place or position in the clipped image (e.g., the horizontal direction in front of the digital camera 100) comes near the center means that the specific spot, place or position is included in a predetermined range of the clipped image, the predetermined range being smaller than half the entire clipped video image, from the center of the clipped image.

Figure 4B:
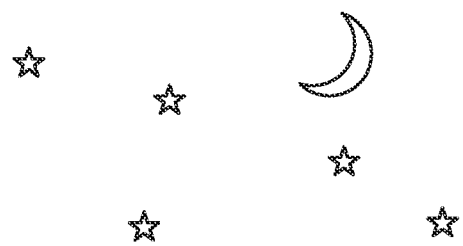
Figure 4B:
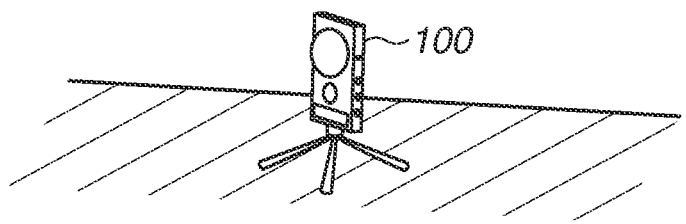

FIG. 4B illustrates a case of capturing an image with the imaging mode set to the starry sky mode, or a case of capturing an image with the installation position set to a mini tripod (desktop tripod). If an image is captured with the imaging mode set to the starry sky mode, a main object is a starry sky, which is the sky above the digital camera 100. In the present exemplary embodiment, if the imaging mode is any one of the imaging modes included in the starry sky mode, clipping processing is performed so that a particular spot, place or position above the digital camera 100 in a direction opposite to the direction of gravity as detected by the orientation detection unit 55 comes to the center or near the center of the clipped image. The upward direction of the digital camera 100 refers to a direction opposite to the bottom surface of the digital camera 100 in which the fixing portion 40 is arranged, i.e., a direction toward the top. If an image is captured with the installation position set to a mini tripod, as illustrated in FIG. 4B, the area below a horizontal axis with respect to the digital camera 100 is mostly occupied by the floor surface which may not be of interest to a user who is attempting to capture an image of a starry night sky. Therefore, a main subject is assumed to be present above the horizontal axis with respect to the digital camera 100. In the present exemplary embodiment, if the installation position is a mini tripod, clipping processing is performed so that an image range in an upward direction of the digital camera 100 or the direction opposite to the direction of gravity as detected by the orientation detection unit 55 is clipped from the captured image and a particular spot, place or position in the clipped image is positioned to the center or near the center of the clipped image.

Figure 4C:
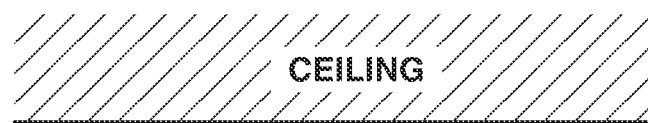
Figure 4C:
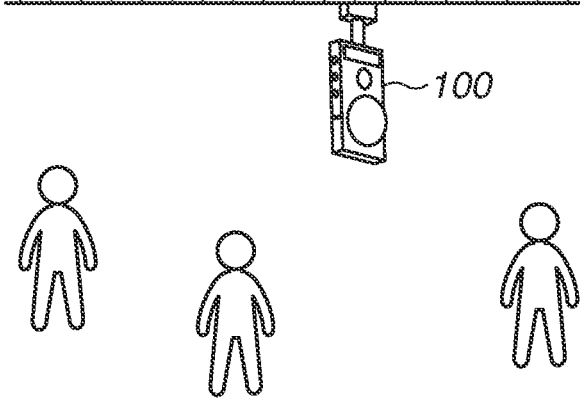

FIG. 4C illustrates a case of capturing an image with the installation position set to the ceiling (ceiling-suspension). If the installation position is the ceiling, as illustrated in FIG. 4C, the bottom side of the digital camera 100 or side of the camera on which the fixing portion 40 is arranged (upper side in the direction of gravity) is located closest to the ceiling in most cases. A main object is thus supposed to be on the top side of the digital camera 100 (the side of the camera that is opposite to the side on which the fixing portion 40 is arranged and used to fix the camera to the ceiling) or below in the direction of gravity. In the present exemplary embodiment, if the installation position is the ceiling, clipping processing is performed so that an image range located in the upward direction of the digital camera 100 (in front of and/or below the installed position of digital camera) or a forward direction in the direction of gravity as detected by the orientation detection unit 55 (i.e., in the direction of gravity) is clipped from the captured image and a particular spot, place or position in the clipped image that corresponds to a horizontal axis with respect to the digital camera 100 is positioned to the center or near the center of the clipped image.

Figure 5:
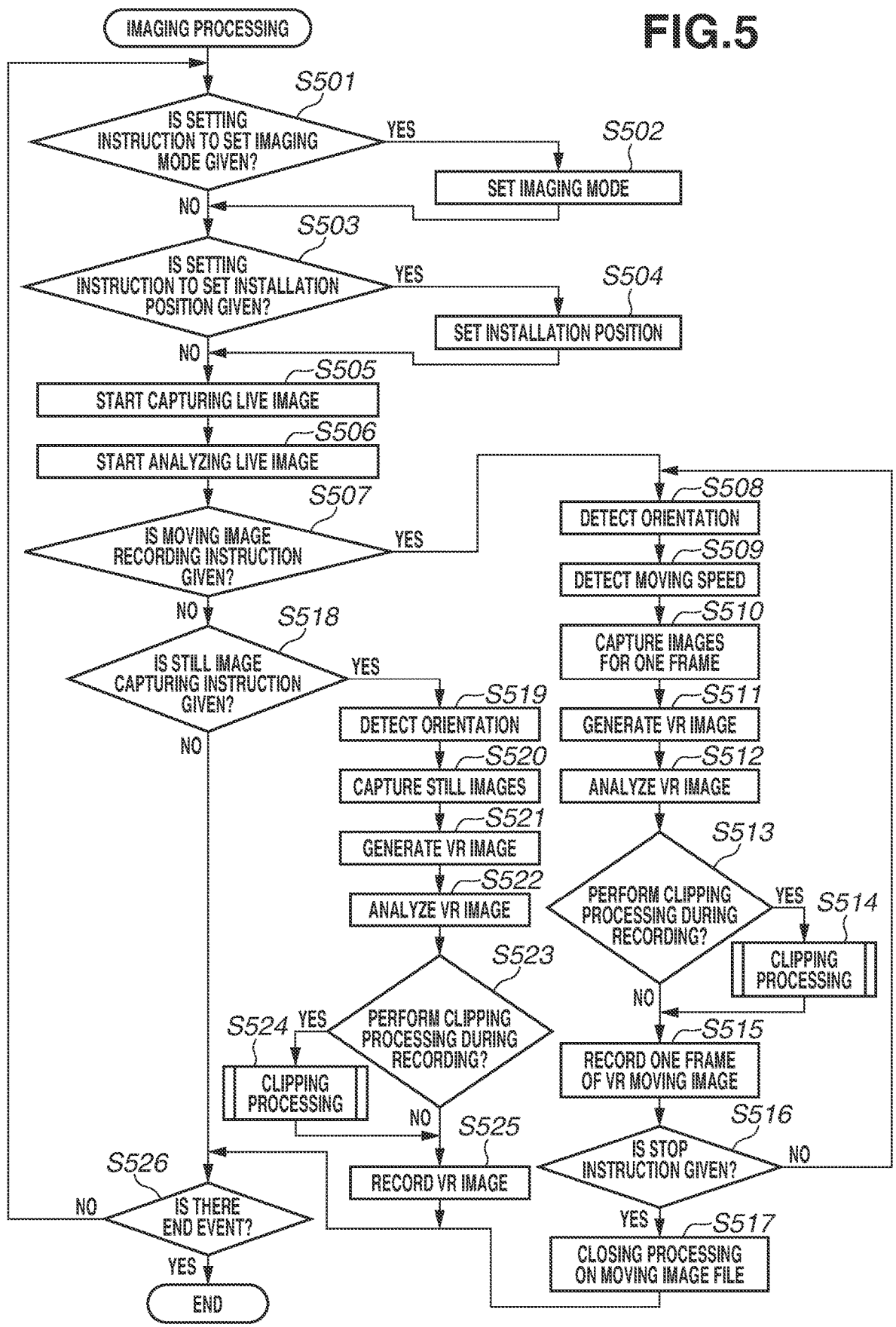
FIG. 5 is a flowchart illustrating imaging processing of a VR image.

FIG. 5 illustrates a flowchart of imaging processing of a VR image by the digital camera 100. This processing is implemented by loading a program recorded in the nonvolatile memory 56 into the system memory 52 and executing the program by the system control unit 50. The processing of FIG. 5 is started if the digital camera 100 is set to an imaging mode and activated in an imaging standby state.

In step S501, the system control unit 50 determines whether a setting instruction to set an imaging mode is given. If a setting instruction to set an imaging mode is given (YES in step S501), the processing proceeds to step S502. If not (NO in step S501), the processing proceeds to step S503. In step S502, the system control unit 50 sets and stores the instructed imaging mode into the nonvolatile memory 56 based on the setting instruction accepted in step S501. The imaging mode is set by the method described with reference to FIG. 3A.

In step S503, the system control unit 50 determines whether a setting instruction to set an installation position is given. If a setting instruction to set an installation position is given (YES in step S503), the processing proceeds to step S504. If not (NO in step S503), the processing proceeds to step S505. In step S504, the system control unit 50 sets and stores the instructed installation position into the nonvolatile memory 56 based on the setting instruction for the installation position accepted in step S503.

In step S505, the system control unit 50 starts capturing a live image (LV image) by the imaging units 22a and 22b. If an external device (e.g., the display control device 200) is connected thereto, the system control unit 50 starts outputting the live image to the external device via the connection I/F 25. As a result, the LV image of the captured VR image is displayed on the display unit of the external device (e.g., the display 205 of the display control device 200).

In step S506, the system control unit 50 starts analyzing the captured live image using the image processing unit 24. The system control unit 50 records movement information and scene determination information in the system memory 52 based on the analysis result.

The movement information is obtained in the following manner. The system control unit 50 analyzes correlation (difference) between frames of the live image, and determines whether the digital camera 100 is moving. For example, a video image in a traveling direction includes image feature points moving radially from a vanishing point located on an extension of the traveling direction. If the analysis result shows such movement, the digital camera 100 is found to be moving toward the vanishing point located on the extension of the traveling direction. Then, the moving speed can be determined from the movement vectors of the respective feature points. The system control unit 50 stores movement information obtained as a result of the analysis, indicating the moving speed of the digital camera 100 or indicating whether the digital camera 100 is moving at a predetermined speed or higher, into the system memory 52. Then, the system control unit 50 records the movement information as attribute information (metadata) about each frame of an image file when capturing and recording a still image or moving image afterward.

The scene determination information is determined based on the brightness of the live image, for example. If the live image is dark as a whole, the imaging scene can be determined to be a dark place. If the live image is dark as a whole but there are several bright spots, the imaging scene can be determined to be a starry sky. Information determined in this way is stored as the scene determination information into the system memory 52. The scene determination information is recorded as attribute information (metadata) about each frame of an image file in capturing and recording a still image or moving image afterward.

In step S507, the system control unit 50 determines whether a moving image recording instruction to start capturing a moving image (recording a moving image) is given. For example, a moving image recording instruction is determined to be given if the shutter button 61 is pressed in a state where the moving image capturing mode is set by the mode change switch 60. The a moving image recording instruction is also determined to be given if a moving image recording instruction is given from the external device side during a remote LV display. If a moving image recording instruction is given (YES in step S507), the processing proceeds to step S508. If not (NO in step S507), the processing proceeds to step S518.

In step S508, the system control unit 50 detects the orientation of the digital camera 100 with respect to the direction of gravity by using the orientation detection unit 55. The system control unit 50 records the orientation in the system memory 52 as orientation information about the next frame of the moving image (VR moving image) to be recorded. In step S513 to be described below, the information is recorded as attribute information (metadata) in association with the frame of the VR moving image.

In step S509, the system control unit 50 detects the moving speed of the digital camera 100 based on the output of the orientation detection unit 55 or a position measurement sensor (not illustrated). The moving speed is not limited to the moving speed detected within one frame period, and is detected in consideration of information obtained from several frames before (e.g., if immediately after a start of recording, the information analyzed in step S506 immediately before the start of recording) as well. Movement information indicating the detected moving speed is recorded in the system memory 52. In step S513 to be described below, the movement information is recorded as attribute information (metadata) in association with the frame of the VR image.

In step S510, the system control unit 50 captures images for one frame by using the imaging units 22a and 22b, and stores the images into the memory 32.

In step S511, the system control unit 50 applies the foregoing connection image processing to the captured images stored in the memory 32 to generate a single VR image by using the image processing unit 24, and stores the VR image into the memory 32.

In step S512, as in step S506, the system control unit 50 analyzes the VR image obtained in step S511 and records movement information and scene determination information depending on the situation. The analysis here is not limited to information obtained within one frame period, and is performed in consideration of information obtained from several frames before (e.g., if immediately after a start of recording, the information analyzed in step S506 immediately before the start of recording) as well.

In step S513, the system control unit 50 determines whether there is a setting to perform clipping processing during recording. Whether to record a VR image of a video image of a narrower range than the entire range that can be captured by the imaging units 22a and 22b (whether to perform the clipping processing during recording), which is obtained by performing clipping during imaging (during recording), can be set by the user in advance. If there is a setting to perform the clipping processing during recording (YES in step S513), the processing proceeds to step S514. If not (NO in step S513), the processing proceeds to step S515.

In step S514, the system control unit 50 performs clipping processing. The clipping processing will be described below with reference to FIG. 7.

In step S515, the system control unit 50 records the VR image stored in the memory 32 as one frame of the VR moving image onto the recording medium 90 in the form of a moving image file. If the clipping processing is performed in step S514, the VR image recorded here is a clipped video image. Attribute information (metadata) that indicates being a VR image and can be used afterward to identify the availability of a VR view is also attached to the moving image file. The orientation information and the scene determination information recorded in the system memory 52 as the information about the frame to be recorded here are recorded as attribute information (metadata) about the frame recorded in step S515, in association with the moving image file. Setting information (imaging mode information) about the imaging mode and setting information (installation position information) about the installation position recorded in the nonvolatile memory 56 are also recorded as attribute information (metadata) about the frame recorded in step S515, in association with the moving image file. The imaging mode information and the installation position information may be recorded as information in units of a moving image file, not as frame-by-frame information.

In step S516, the system control unit 50 determines whether a stop instruction for the recording of the moving image is given. If a stop instruction for the recording of the moving image is given (YES in step S516), the processing proceeds to step S517. If no stop instruction is given (NO in step S516), the processing proceeds to step S508. In step S508, the system control unit 50 performs processing for the next frame.

In step S517, the system control unit 50 performs closing processing on the moving image file recorded on the recording medium 90.

In step S518, the system control unit 50 determines whether a still image capturing instruction to capture a still image is given. For example, a still image capturing instruction is determined to be given if the shutter button 61 is pressed in a state where the still image capturing mode is set using the mode change switch 60. A still image capturing instruction is also determined to be given if a still image capturing instruction is given from the external device side during a remote LV display. If a still image capturing instruction is given (YES in step S518), the processing proceeds to step S519. If not (NO in step S518), the processing proceeds to step S526.

In step S519, the system control unit 50 detects the orientation of the digital camera 100 with respect to the direction of gravity by using the orientation detection unit 55, and records the orientation into the system memory 52 as orientation information about a still image to be recorded. In step S525 to be described below, the information is recorded as attribute information in association with a VR image, which is a still image.

In step S520, the system control unit 50 captures still images by using the imaging units 22a and 22b, and stores the still images into the memory 32.

In step S521, the system control unit 50 applies the foregoing connection image processing to the captured images stored in the memory 32 to generate a single VR image by using the image processing unit 24, and stores the VR image into the memory 32.

In step S522, similarly in step S506, the system control unit 50 analyzes the VR image obtained in step S521, and records movement information and scene determination information corresponding to the situation. The analysis here is not limited to information obtained within a period of one still image, and is performed in consideration of information obtained from several frames before (e.g., the information analyzed in step S506 before capturing the still images) as well.

In step S523, similarly in step S513, the system control unit 50 determines whether there is a setting to perform clipping processing during recording. If there is a setting to perform the clipping processing during recording (YES in step S523), the processing proceeds to step S524. If not (NO in step S523), the processing proceeds to step S525.

In step S524, the system control unit 50 performs clipping processing. The clipping processing will be described below with reference to FIG. 7.

In step S525, the system control unit 50 records the VR image (still image) stored in the memory 32 onto the recording medium 90 as an image file. If clipping processing is performed in step S524, the VR image recorded here is a clipped video image. Attribute information (metadata) that indicates being a VR image and can be used afterward to identify whether a VR view is possible is also attached to the image file. The orientation information and the scene determination information recorded in the system memory 52 as the information about the still image to be recorded here are recorded as attribute information (metadata) about the VR image recorded in step S525, in association with the image file. The setting information (imaging mode information) about the imaging mode and the setting information (installation position information) about the installation position recorded in the nonvolatile memory 56 are also recorded as attribute information (metadata) about the VR image recorded in step S525, in association with the image file.

In step S526, the system control unit 50 determines whether there is an end event such as a power-off and a shift instruction to an operation mode other than the imaging modes. If there is no end event (NO in step S526), the processing proceeds to step S501 and the imaging processing is repeated. If there is an end event (YES in step S526), the imaging processing ends.

An VR image to be reproduced and displayed by display processing to be described below is recorded as described above. The VR image recorded on the recording medium 90 can be displayed on the display control device 200 by mounting the recording medium 90 into the display control device 200 or transferring the VR image to the display control device 200 in a wireless or wired manner.

Figure 6:
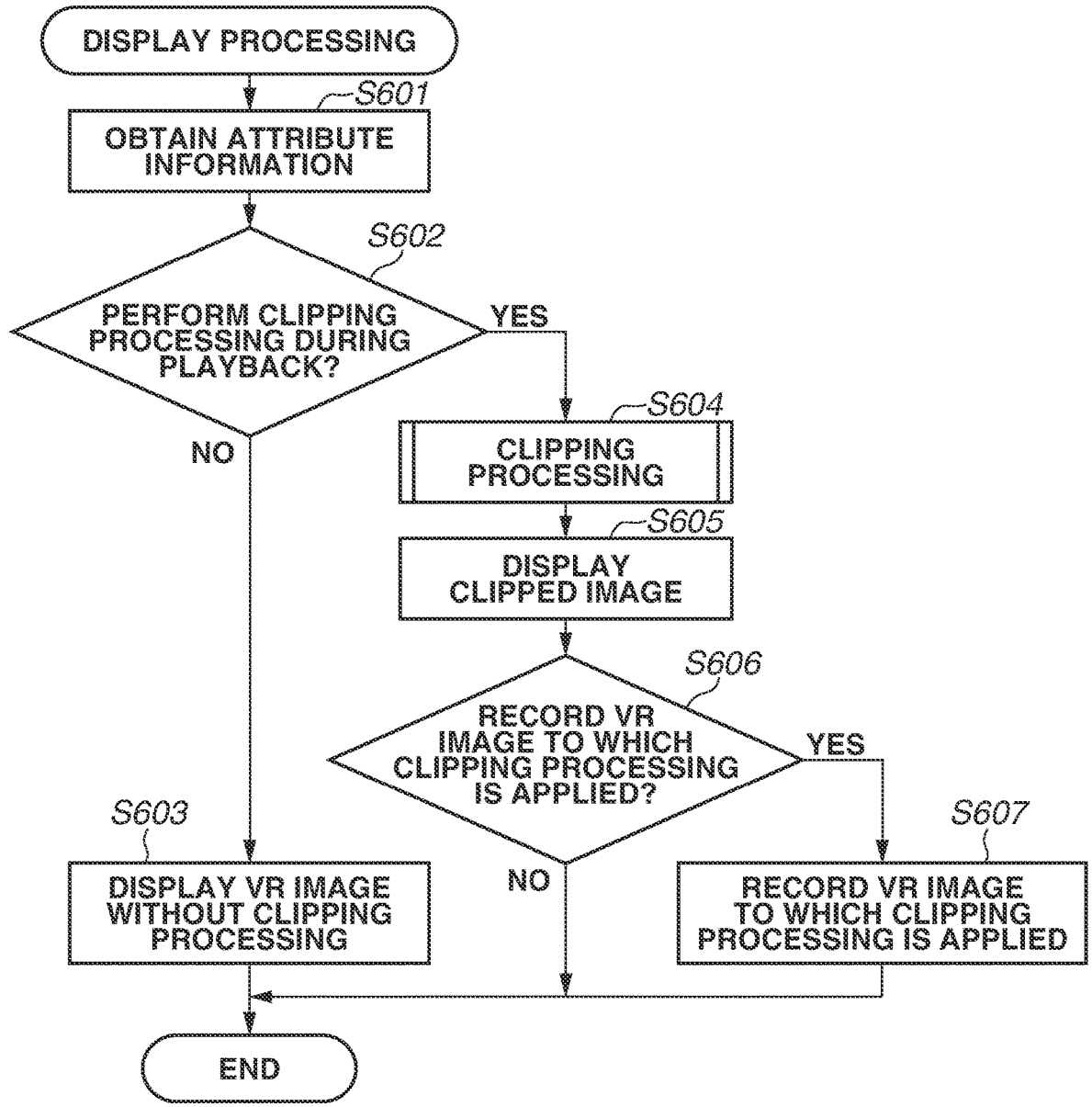
FIG. 6 is a flowchart illustrating display processing of a VR image.

FIG. 6 illustrates a flowchart of the display processing of a VR image, performed by the display control device 200. The processing is implemented by the CPU 201 loading and executing a program recorded in the nonvolatile memory 203 by using the memory 202 as a work memory. The processing of FIG. 6 is started if a VR image is selected from images listed on the display 205 and an instruction to reproduce and display the VR image is given.

In step S601, the CPU 201 reads and obtains the attribute information about the VR image to be displayed into the memory 202 (information acquisition and reading).

In step S602, the CPU 201 determines whether to perform clipping processing during playback. If the clipping processing during playback is to be performed (YES in step S602), the processing proceeds to step S604. If not (NO in step S602), the processing proceeds to step S603. The CPU 201 determines to perform the clipping processing during playback if at least one of the following conditions is not satisfied: that the VR image is the VR image to which the clipping processing during recording has been applied, that the effective range of the video image is already narrower than an image resulting from clipping, and that there is a setting not to perform the clipping processing during playback. The CPU 201 determines not to perform the clipping processing if any of the conditions is satisfied.

In step S603, the CPU 201 displays the VR image without performing clipping processing. Display examples in such a case will be described below with reference to FIGS. 8A to 8C.

In step S604, the CPU 201 performs the clipping processing during playback. This processing is basically the same processing as the foregoing clipping processing during recording except that the timing of execution is different. The clipping processing will be described below with reference to FIG. 7.

In step S605, the CPU 201 displays the clipped image (VR image to which the clipping processing is applied). Display examples in such a case will be described below with reference to FIGS. 9A to 9C.

In step S606, the CPU 201 determines whether an instruction to record the VR image to which the clipping processing is applied in step S604 is given. If an instruction to save the VR image to which the clipping processing is applied is given from the user (YES in step S606), the processing proceeds to step S607. If not (NO in step S606), the processing ends.

In step S607, the CPU 201 records the VR image to which the clipping processing is applied in step S604 into the storage medium 208. At this time, attribute information indicating the application of the clipping processing is recorded in association with the VR image. Alternatively, the information indicating the effective video range may be simply updated with that after the clipping processing. The purpose is to prevent the clipping processing from being redundantly applied afterward to the VR image to which the clipping processing is applied, or to enable processing for identifying and narrowing down VR images to which the clipping processing is applied.

Figure 7:
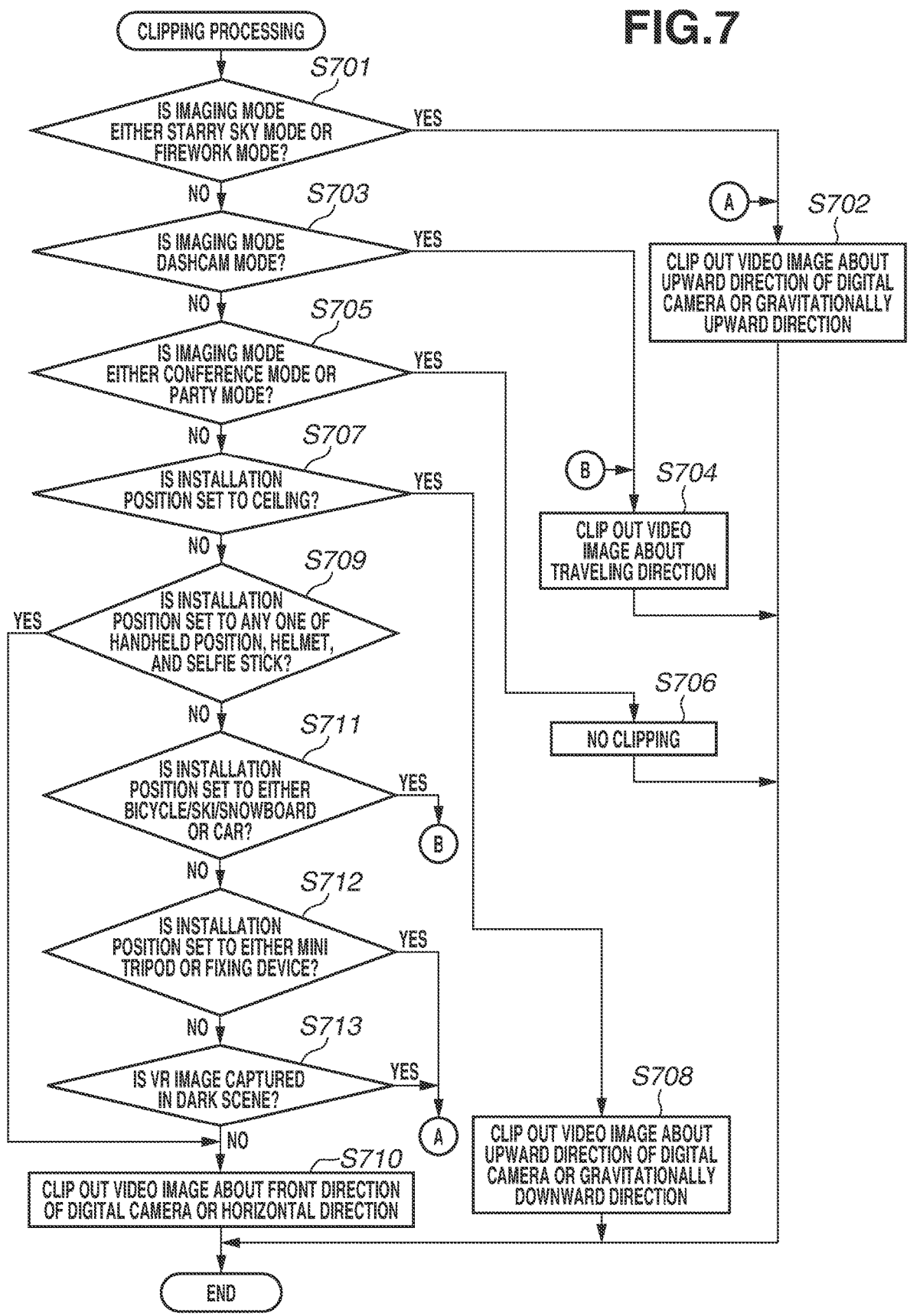
FIG. 7 is a detailed flowchart of clipping processing.

FIG. 7 illustrates a detailed flowchart of the clipping processing described above in steps S514 and S524 of FIG. 5. This processing is implemented by the system control unit 50 loading a program recorded in the nonvolatile memory 56 into the system memory 52 and executing the program. The system control unit 50 performs the determination steps based on various types of analysis information and detection information stored in the system memory 52 and the setting information recorded in the nonvolatile memory 56. The processing of FIG. 7 is also performed by the CPU 201 in the foregoing step S604 of FIG. 6. The processing, if performed as the processing of step S604 of FIG. 6, is implemented by the CPU 201 loading a program recorded in the nonvolatile memory 203 into the memory 202 and executing the program. The CPU 201 performs the determination steps based on the attribute information obtained in step S601. The processing of steps S514 and S524 in FIG. 5 will be described below, with the system control unit 50 as the operating agent. In the case of the processing of step S604 in FIG. 6, the CPU 201 performs the processing.

In step S701, the system control unit 50 determines whether the imaging mode of the imaging apparatus in capturing the VR image to be displayed is either the starry sky mode or a firework mode (skyrocket mode). If the imaging mode is the starry sky mode or the firework mode (YES in step S701), the processing proceeds to step S702. If the imaging mode is the starry sky mode or the firework mode, a main object is assumed to be in the sky, i.e., above. Therefore, in step S702, the system control unit 50 clips out a video image in the upward direction of the digital camera 100 or above in the direction of gravity to generate a VR image that does not include any video image in the downward direction of the digital camera 100 or below in the direction of gravity.

In step S702, the system control unit 50 clips a narrower range than the entire range of the unclipped VR image out of the VR image about the upward direction of the digital camera 100 or the gravitationally upward direction by using the image processing unit 24 (in the case of the display control device 200, by using the image processing unit 204). Then, the system control unit 50 stores the clipped video image into the memory 32 (in the case of the display control device 200, the memory 202). For example, the system control unit 50 clips a full 360° VR video image and the clipped image has a field of view range that is 180° of the full VR video image. The video image is clipped with respect to a horizontal axis that corresponds to a position of the digital camera within the full VR video image. As a result, the full VR image is clipped so as not to include half of the full VR video image that is below the horizontal axis that corresponds to the camera's position within the full 360° VR image. Accordingly, a clipped image is produced that contains only an area of the full VR image that may be of interest to a user of the digital camera 100.

In step S703, the system control unit 50 determines whether the imaging mode of the imaging apparatus in capturing the VR image to be displayed is the event data recorder mode. If the imaging mode is the event data recorder mode (YES in step S703), the processing proceeds to step S704. If the imaging mode is the event data recorder mode, a main object is assumed to be present in the traveling direction of the car. Therefore, in step S704, the system control unit 50 clips out a video image in the traveling direction (in front of the car or camera with respect to the direction in which the car travels) to generate a VR image that does not include any video image in a direction opposite to the traveling direction (behind the car or camera with respect to the direction in which the car travels).

In step S704, the system control unit 50 clips a narrower range than the entire range of the unclipped VR image out of the VR image about the traveling direction by using the image processing unit 24 (in the case of the display control device 200, by using the image processing unit 204). The system control unit 50 then stores the clipped video image into the memory 32 (in the case of the display control device 200, the memory 202). For example, the system control unit 50 clips a full 360° video image and the clipped image has a field of view range that is 180° of the full VR video image. The video image is clipped with respect to a vertical axis that corresponds to a position of the digital camera within the full VR image. As a result, the full VR image is clipped so as not to include half of the full VR video image that is behind the vertical axis that corresponds to the camera's position within the full 360° VR image (i.e. the video image behind the car or camera with respect to a direction of travel is not included in the clipped VR image). The vertical axis in this case is an axis that is perpendicular to the horizontal axis described at step S702.

In step S705, the system control unit 50 determines whether the imaging mode of the imaging apparatus in capturing the VR image to be displayed is either the conference mode or the party mode. If the imaging mode is the conference mode or the party mode (YES in step S705), the processing proceeds to step S706. If the imaging mode is the conference mode or the party mode and the VR image is captured with the digital camera 100 installed in the center of people present in the conference or party, main objects can be present horizontally 360° around the digital camera 100. Therefore, in step S706, the system control unit 50 does not perform any clipping of the full 360° VR video image. There may be no object of interest directly above or directly below the digital camera 100. Therefore, instead of the S706, the system control unit 50 may clip out (cut out) an entire horizontal range within a predetermined range above (within a predetermined angle of elevation) and within a predetermined range below (within a predetermined angle of depression) to eliminate at least either one of video images outside the upper predetermined range and outside the lower predetermined range.

In step S706, the system control unit 50 stores information indicating completion of processing into the system memory 52 without clipping the VR image.

In step S707, the system control unit 50 determines whether the installation position of the digital camera 100 in capturing the VR image is set to the ceiling. If the installation position is the ceiling (YES in step S707), the processing proceeds to step S708. If not (NO in step S707), the processing proceeds to step S709. As described in FIG. 4C, if the installation position is the ceiling, a main object is likely to be present in the upward direction of the digital camera 100 (a side of the camera that is opposite to the side attached to the ceiling) or below in the direction of gravity. Therefore, in step S708, the system control unit 50 clips out a video image in the upward direction of the digital camera 100 or below in the direction of gravity to generate a VR image that does not include video image of scene in the downward direction of the digital camera 100 or above in the direction of gravity.

In step S708, the system control unit 50 clips a narrower range than the entire range of the unclipped VR image out of the VR image about the upward direction of the digital camera 100 or the gravitationally downward direction by using the image processing unit 24 (in the case of the display control device 200, by using the image processing unit 204). The system control unit 50 then stores the clipped video image into the memory 32 (in the case of the display control device 200, the memory 202). For example, the system control unit 50 clips a full 360° VR video image and the clipped image has a field of view range that is 180° of the full VR video image. The full 360° video image is clipped with respect to a horizontal axis that corresponds to a position of the digital camera within the full VR video image. As a result, the full VR video image is clipped so as not to include half of the full VR video image that is below the horizontal axis that corresponds to the camera's position within the full VR image.

In step S709, the system control unit 50 determines whether the installation position of the digital camera 100 in capturing the VR image is set to any one of a handheld position, a helmet, and a selfie stick. If the installation position is any one of these (YES in step S709), the processing proceeds to step S710. If not (NO in step S709), the processing proceeds to step S711. If the installation position of the digital camera 100 is set to a handheld position or a helmet, as described in FIG. 4A, a main object is likely to be present in the front direction of the digital camera 100 (horizontal direction as seen from the digital camera 100 or in front of the position at which the digital camera is supported). Therefore, in step S710, the system control unit 50 clips out a video image in the front direction of the digital camera 100 (or any one of horizontal directions or in front of the position at which the digital camera is supported).

In step S710, the system control unit 50 clips a narrower range than the entire range of the unclipped VR image out of the VR image about the front direction of the digital camera 100 by using the image processing unit 24 (in the case of the display control device 200, by using the image processing unit 204). Then, the system control unit 50 stores the clipped video image into the memory 32 (in the case of the display control device 200, the memory 202). For example, the system control unit 50 clips a full 360° video image and the clipped image has a field of view range that is 180° of the full VR video image. The video image is clipped with respect to a vertical axis that corresponds to a position of the digital camera within the full VR image (i.e. the video image behind the digital camera is not included in the clipped VR image) As a result, the full VR image is clipped so as not to include half of the full VR video image. In the processing of step S710, the system control unit 50 only needs to clip out (cut out) a part of the full VR video image in which a main object that is interesting to a user is assumed to be present, and does not necessarily need to clip out (cut out) a part of the full VR video image that is determined to be 180° of the full VR image and in front of the digital camera 100. For example, the system control unit 50 may clip out (cut out) a video image about, among other horizontal directions, a direction in which the face of a person assumed to be a main object is captured, a direction opposite to that in which the user of digital camera 100 is assumed to be captured, a direction in which there are a lot of moving bodies, or a direction opposite to that in which an object greater than or equal to a predetermined area lies still during a long period of time. If the installation position is a selfie stick, the main object is assumed to be the user of digital camera 100. In such a case, a video image in a direction in which the largest face (which can be assumed to be that of the user of digital camera 100) is captured among all horizontal directions may be clipped out to generate a VR image including no video image in the opposite direction. If the installation position is set to a handheld position, a main object can be assumed to be present in the line of sight direction of the user of digital camera 100. In such a case, a video image in a direction opposite to that in which the largest face (which can be assumed to be that of the user of digital camera 100) is captured (the direction of the user's line of sight) among other horizontal directions may be clipped out to generate a VR image including no video image in the opposite direction.

In step S711, the system control unit 50 determines whether the installation position of the digital camera 100 in capturing the VR image is set to either a bicycle/ski/snowboard or a car. If the installation position is either of these (YES in step S711), the processing proceeds to step S704. If not (NO in step S711), the processing proceeds to step S712. If the installation position of the digital camera 100 is a traveling vehicle such as a bicycle, a ski, a snowboard, and a car, a main object is likely to be present in front of the camera and in the direction that the vehicle travels. Therefore, in step S704, the system control unit 50 clips out a video image in the traveling direction.

In step S712, the system control unit 50 determines whether the installation position of the digital camera 100 in capturing the VR image is set to either a mini tripod (desktop tripod) or a fixing device having a height as small as or smaller than that of a mini tripod (fixing device having a height of approximately 20 cm or less). If the installation position is either of these (YES in step S712), the processing proceeds to step S702. If not (NO in step S712), the processing proceeds to step S713. In the former case, as described in FIG. 4B, a main object is likely to be present in the upward direction of the digital camera 100 or above in the direction of gravity. Therefore, in step S702, the system control unit 50 clips out a video image in the upward direction of the digital camera 100 or above in the direction of gravity (the video image is clipped with respect to a horizontal axis that corresponds to a position of the digital camera within the full VR video image and the clipped video image does not include a part of the full VR image that is below the horizontal axis).

In step S713, the system control unit 50 determines whether the VR image is an image captured in a dark scene. If the VR image is an image captured in a dark scene (YES in step S713), the processing proceeds to step S702. If not (NO in step S713), the processing proceeds to step S710. If the VR image is an image captured in a dark scene, the system control unit 50 performs the processing of step S702, assuming that a main object is likely to be in the sky. If none of the conditions of steps S701, S703, S705, S707, S709, S711, S712, and S713 is satisfied, the processing proceeds to step S710. In other words, if none of the conditions under which the direction of clipping can be estimated is satisfied, the system control unit 50 clips out a range basically about the front side of (in front of) the digital camera 100 among other horizontal directions.

Display examples of VR images that are clipped as described above and VR images on which no clipping processing is performed will be described.

A display in a case where no clipping processing is performed will be described with reference to FIGS. 8A to 8C. This processing is performed in step S603 described above.

Figure 8A:
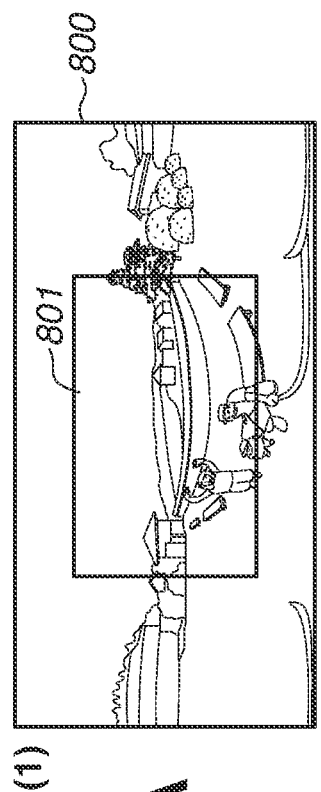
FIGS. 8A to 8C are display examples of a VR image to which no clipping processing is applied.
Figure 8A:
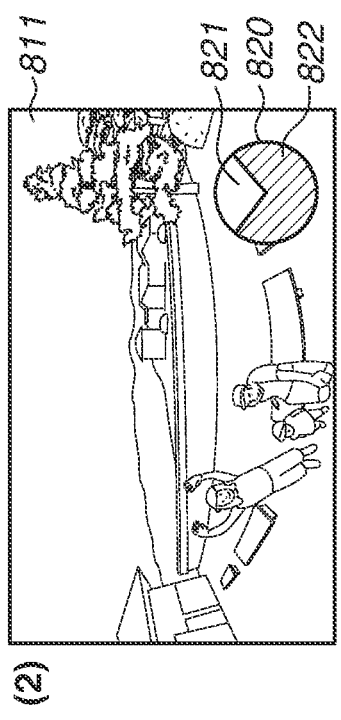

FIG. 8A (1) is a diagram illustrating an entire VR image 800 on which no clipping processing is performed. The VR image 800 is an equidistant cylindrical projection image, and thus provides a distorted video image different from actual objects in the natural world. FIG. 8A (2) illustrates a display example in a case where the range of a frame 801, which is a partial range in FIG. 8A (1), is enlarged and displayed on the display 205. Distortion correction processing is performed so that a display image 811 is displayed to provide a video image similar to actual objects in the natural world. Because of the distortion correction, the range of the display image 811 with respect to the entire VR image 800 is not exactly rectangular. In other words, the frame 801 does not represent the exact display range but provides a rough indication of the range. A guide 820 is a guide display indicating which range in the entire VR image 800 the video image of the display image 811 is in. A display range area 821 represents the range of the display image 811. The display range area 821 indicates which horizontal range in the entire VR image 800 the video image of the display image 811 is in. It can be seen from FIG. 8A (1) that the front side of the digital camera 100 is displayed. A non-display range area 822 represents the horizontal range of video image not displayed in the entire VR image 800. The range of the video image displayed on the display 205 (display range) can be changed by user operations. For example, the display range can be changed by a touch-move on the display 205. In a VR view, the display range can be changed by changing the orientation or direction of the display control device 200.

Figure 8B:
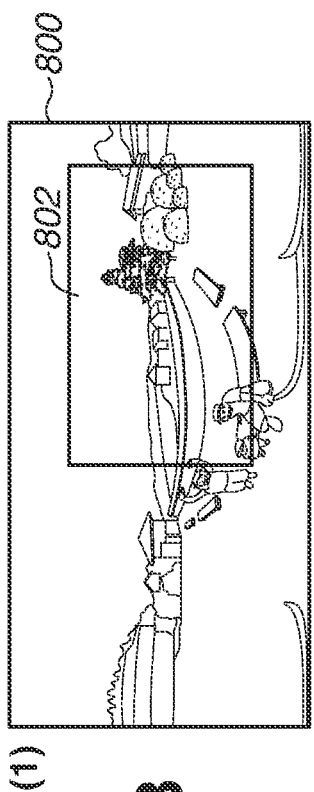
Figure 8B:
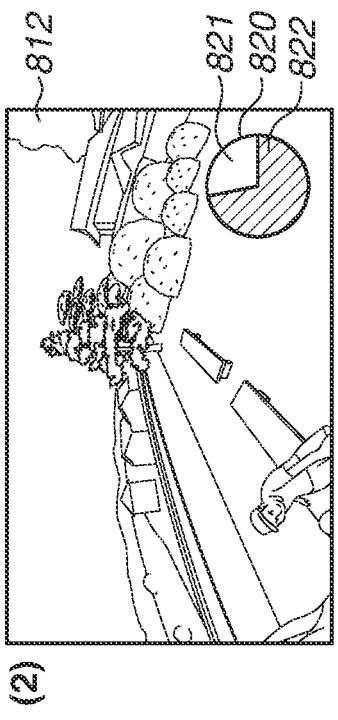

FIG. 8B (2) illustrates a display example in a case where the display range is moved to the right from the state in FIG. 8A (2). FIG. 8B (1) illustrates the position of the display range (the position of a frame 802) with respect to the VR image 800 in such a case.

Figure 8C:
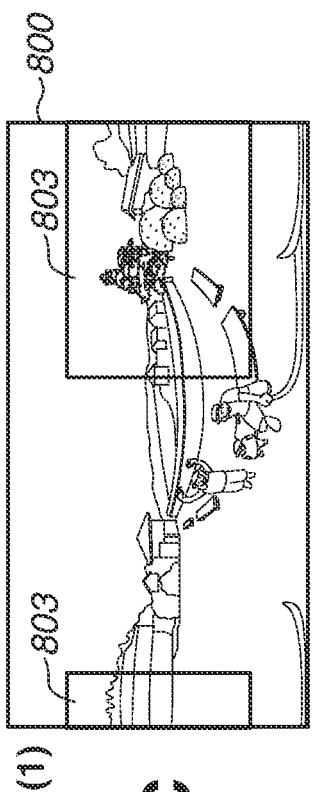
Figure 8C:
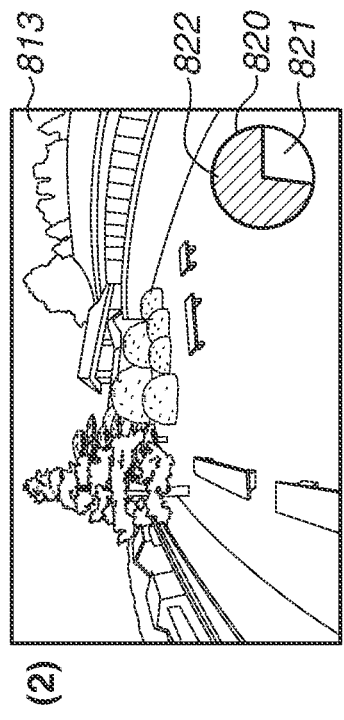

FIG. 8C (2) illustrates a display example in a case where the display range is moved to the right from the state in FIG. 8B (2). FIG. 8C (1) illustrates the position of the display range (the position of a frame 803) with respect to the VR image 800 in such a case. In this way, if clipping is not performed, there is an effective video image area even behind the digital camera 100, and the effective video image area can be displayed on the display 205.

A display with clipping processing will be described with reference to FIGS. 9A to 9C. This processing is performed in step S605 described above.

Figure 9A:
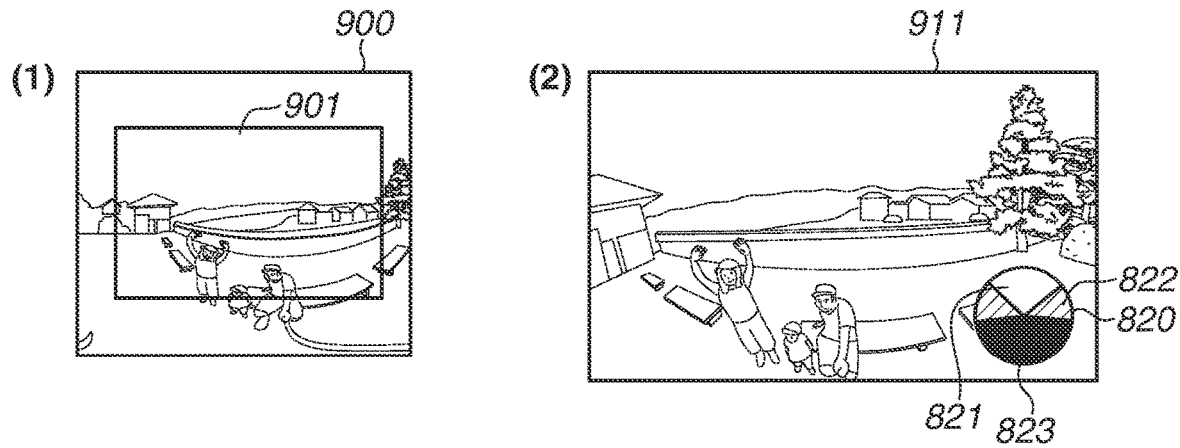
FIGS. 9A to 9C are display examples of a VR image to which the clipping processing is applied.

FIG. 9A (1) is a diagram illustrating an entire VR image 900 on which clipping processing is performed. The VR image 900 is an image obtained by applying the clipping of step S710 to the VR image 800. As a result, a video image behind the digital camera 100 is deleted to narrow the effective video range. FIG. 9A (2) illustrates a display example in a case where the range of a frame 901, which is a partial range in FIG. 9A (1), is enlarged and displayed on the display 205. Distortion correction processing is performed so that a display image 911 is displayed to provide a video image similar to actual objects in the natural world. Because of the distortion correction, the range of the display image 911 with respect to the entire VR image 900 is not exactly rectangular. In other words, the frame 901 does not represent the exact display range but provides a rough indication of the range. The guide 820 includes an ineffective video range area 823 representing the range of an ineffective video range where there is no captured video image. In such a manner, a clipped video image can be viewed as a VR image with no particular difference from an unclipped video image, as long as the center direction side of the clipping is viewed. Such a clipped video image can also be displayed in a VR view.

Figure 9B:
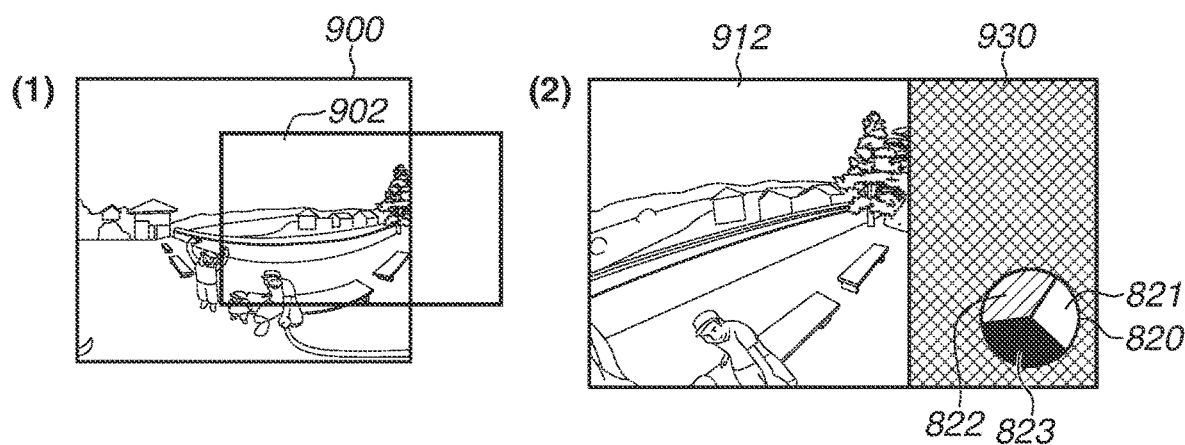

FIG. 9B (2) illustrates a display example in a case where the display range is moved to the right from the state in FIG. 9A (2). FIG. 9B (1) illustrates the position of the display range (the position of a frame 902) with respect to the VR image 900 in such a case. Since the display range includes the ineffective video image area, a blank area 930 is displayed on the display 205. The changeable range of the display range may be limited between the ends of the effective video range so that the blank area 930 will not be displayed.

Figure 9C:
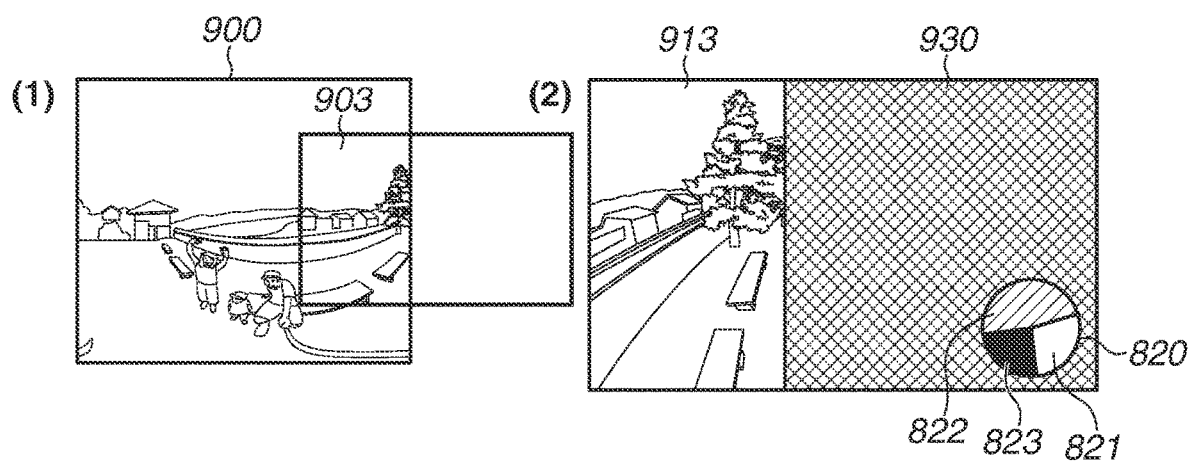

FIG. 9C (2) illustrates a display example in a case where the display range is moved to the right from the state in FIG. 9B (2). FIG. 9C (1) illustrates the position of the display range (the position of a frame 903) with respect to the VR image 900 in such a case. If the VR image 900 is thus clipped, there is no effective video area behind the digital camera 100. This can prevent unwanted video images from being seen, and can reduce the volume of data of the VR image 900.

The foregoing various controls described to be performed by the system control unit 50 and the foregoing various controls described to be performed by the CPU 201 may be performed by a single piece of hardware. A plurality of pieces of hardware may control the entire apparatus(es) by performing processing in a distributed manner Examples of a plurality of pieces of hardware include a plurality of processors, a plurality of circuits, and a combination of a processor and a circuit.

While the exemplary embodiment of the present invention has been described in detail, the present invention is not limited to such a specific exemplary embodiment, and various modes within a scope not departing from the gist of the present invention are also embraced by the present invention. The foregoing exemplary embodiment only demonstrates an exemplary embodiment of the present invention, and various exemplary embodiments may be combined as appropriate.

The foregoing exemplary embodiment is described by using a case where an exemplary embodiment of the present invention is applied to the digital camera 100 or the display control device 200 as an example. However, such an example is not restrictive. An exemplary embodiment of the present invention is applicable to any electronic apparatus that can capture or display a VR image (wide field view image including a video image having a wide field of view angle). In other words, an exemplary embodiment of the present invention is applicable to a personal computer, a personal digital assistance (PDA), a mobile phone terminal, a portable image viewer, a printer apparatus including a display, a digital photo frame, a music player, a game console, and an electronic book reader.

According to an exemplary embodiment of the present invention, a more suitable range can be clipped out of a wide field view image without complicated operations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-254236, filed Dec. 28, 2017, which is hereby incorporated by reference herein in its entirety.

What is claimed is:

1. An electronic apparatus comprising a memory and at least one processor and/or at least one circuit to perform the operations of the following units:

an image acquisition unit configured to obtain a wide field view image having a wide field of view angle, captured by one or more image sensors; and a control unit configured to, perform control, in the case that the wide field view image is obtained using a first operation mode, to clip a first range narrower than an entire range of the wide field view image about a vertical axis to a position of the electronic device at the time of capturing, out of the wide field view image, and perform control, in the case that the wide field view image is captured using a second operation mode:

to clip a second range narrower than the entire range of the wide field view image about a horizontal axis to the position of the electronic device at the time of capturing and different from the first range, out of the wide field view image, wherein the first operation mode and the second operation mode are different imaging modes from each other.

2. The electronic apparatus according to claim 1, wherein the first range is a field of view angle of 180° about the vertical axis in the wide field view image and the second range is a field of view angle of 180° about the horizontal axis in the wide field view image.

3. The electronic apparatus according to claim 1, wherein the first operation mode is an imaging mode for capturing an image of a starry sky.

4. The electronic apparatus according to claim 1, wherein the electronic device is installed at different places in the first operation mode and the second operation mode, respectively.

5. The electronic apparatus according to claim 4, wherein the electronic device is installed at either a ceiling or a mini tripod in the first operation mode.

6. The electronic apparatus according to claim 5, wherein, when the electronic device is installed at the ceiling, a range in which a predetermined range with respect to a center of a clipped image includes an upward direction of the imaging apparatus or below in the direction of gravity is clipped out as the first range, the range being a part of the wide field view image.

7. The electronic apparatus according to claim 1, wherein the electronic device is installed at any one of handheld, helmet, selfie stick, and traveling vehicle in the second operation mode.

8. The electronic apparatus according to claim 1, wherein the control unit is further configured to perform control not to clip the wide field view image in the case that the wide field view image is obtained using a conference mode or a party mode which are different from the first operation mode and the second operation mode.

9. The electronic apparatus according to claim 1, wherein the wide field view image is at least any one of an omnidirectional image, an entire celestial sphere image, and an image including an image having a field of view angle greater than 180°.

10. The electronic apparatus according to claim 1, wherein the wide field view image is a VR image.

11. A non-transitory computer-readable storage medium storing a program which, when the program is executed by a computer, causes the computer to function as the units of the electronic apparatus according claim 1.

12. A method for controlling an electronic apparatus, comprising:

obtaining a wide field view image having a wide field of view angle, captured by one or more image sensors; and performing control to:

in the case that the wide field view image is obtained using a first operation mode, clip a first range narrower than an entire range of the wide field view image about a vertical axis to a position of the electronic device at the time of capturing, out of the wide field view image, and in the case that the wide field view image is captured using a second operation mode, clip a second range narrower than the entire range of the wide field view image about a horizontal axis to the position of the electronic device at the time of capturing and different from the first range, out of the wide field view image, wherein the first operation mode and the second operation mode are different imaging modes from each other.

13. A non-transitory computer-readable storage medium storing a program which, when the program is executed by a computer, causes the computer to carry out the method of claim 12.

14. The electronic apparatus according to claim 1, wherein the position of the electronic device at the time of capturing is adjusted in accordance with rotating wide field view image for tilt correction.

* * * * *